(12) United States Patent
Inoue et al.

(10) Patent No.: US 7,651,805 B2
(45) Date of Patent: *Jan. 26, 2010

(54) FUEL CELL HAVING SEALANT FOR SEALING A SOLID POLYMER ELECTROLYTE MEMBRANE

(75) Inventors: Masajiro Inoue, Wako (JP); Nobuaki Kimura, Wako (JP); Toshihiko Suenaga, Wako (JP); Harumi Hatano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 472 days.

This patent is subject to a terminal disclaimer.

(21) Appl. No.: 10/752,768

(22) Filed: Jan. 6, 2004

(65) Prior Publication Data

US 2004/0137305 A1    Jul. 15, 2004

Related U.S. Application Data

(62) Division of application No. 09/841,895, filed on May 2, 2001, now Pat. No. 6,699,613.

(30) Foreign Application Priority Data

| May 2, 2000 | (JP) | ............................. 2000-133862 |
| May 2, 2000 | (JP) | ............................. 2000-133865 |
| May 2, 2000 | (JP) | ............................. 2000-133866 |
| May 19, 2000 | (JP) | ............................. 2000-149068 |

(51) Int. Cl.
*H01M 2/02* (2006.01)

(52) U.S. Cl. ............................. 429/34; 429/35; 429/36; 429/30

(58) Field of Classification Search .................. 429/30, 429/32, 34, 35, 36, 38; 427/115
See application file for complete search history.

(56) References Cited

U.S. PATENT DOCUMENTS 4,510,213 A    4/1985    Schnacke (Continued)

FOREIGN PATENT DOCUMENTS

DE    43 09 976 A1    9/1994

(Continued)

OTHER PUBLICATIONS

Japanese Office Action for Application No. 2000-133866, dated Jan. 4, 2006.

*Primary Examiner*—Raymond Alejandro
(74) *Attorney, Agent, or Firm*—Lahive & Cockfield, LLP; Anthony A. Laurentano

(57) ABSTRACT

The fuel cell comprises: a membrane electrode assembly having a solid polymer electrolyte membrane, an anode side diffusion electrode (an anode electrode, and a second diffusion layer) disposed at one side of the solid polymer electrolyte membrane, and a cathode side diffusion electrode (a cathode electrode, and a first diffusion layer) disposed at the other side of the solid polymer electrolyte membrane; a pair of separators which hold the membrane electrode assembly; a projecting portion which extends from the solid polymer electrolyte membrane and which projects from the peripheries of the anode side diffusion electrode and the cathode side diffusion electrode; and a seal, provided on the separators, which was liquid sealant at the time of application. The seal makes contact with the projecting portion while the membrane electrode assembly is disposed between the separators.

4 Claims, 36 Drawing Sheets

U.S. PATENT DOCUMENTS

| | | | |
|---|---|---|---|
| 5,232,792 A * | 8/1993 | Reznikov | 429/14 |
| 5,464,700 A | 11/1995 | Steck et al. | |
| 6,007,933 A | 12/1999 | Jones | |
| 6,080,503 A | 6/2000 | Schmid et al. | |
| 6,451,468 B1 | 9/2002 | Adachi | |
| 7,081,314 B2 * | 7/2006 | Inoue et al. | 429/34 |
| 2001/0044042 A1 | 11/2001 | Inoue et al. | |
| 2005/0191538 A1 * | 9/2005 | Diez | 429/38 |

FOREIGN PATENT DOCUMENTS

| | | |
|---|---|---|
| DE | 197 13 250 A1 | 10/1998 |
| DE | 198 21 767 C2 | 6/2000 |
| DE | 199 83 846 T1 | 3/2002 |
| EP | 0604683 A1 | 7/1994 |
| EP | 620 609 B1 | 8/1997 |
| EP | 1 009 051 A2 | 6/2000 |
| EP | 1 086 502 B1 | 4/2002 |
| JP | 59-103077 | 6/1984 |
| JP | 63-80485 | 4/1988 |
| JP | 1-296569 | 11/1989 |
| JP | 6-68884 | 3/1994 |
| JP | H6-96783 | 4/1994 |
| JP | 6-325777 | 11/1994 |
| JP | 8-45517 | 2/1996 |
| JP | 8-148169 | 6/1996 |
| JP | 9-289029 | 11/1997 |
| JP | 11-154522 | 6/1999 |
| JP | 2000-67900 | 3/2000 |
| JP | 2001-325972 | 11/2001 |
| WO | WO 98/33221 | 7/1998 |
| WO | WO 99/04446 A1 | 1/1999 |
| WO | WO 99/53559 | 10/1999 |
| WO | WO 00/39862 A1 | 7/2000 |
| WO | WO 02/23656 A1 | 3/2002 |

* cited by examiner

FIG. 41
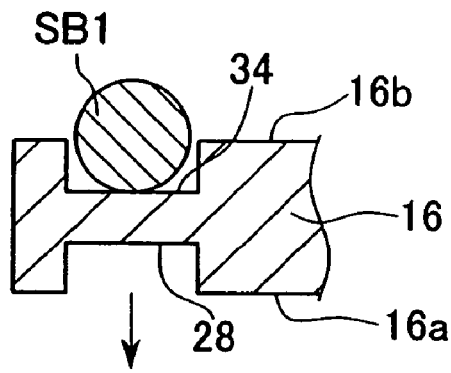
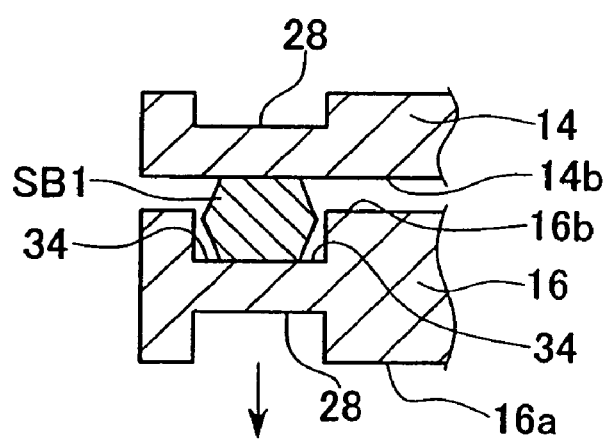
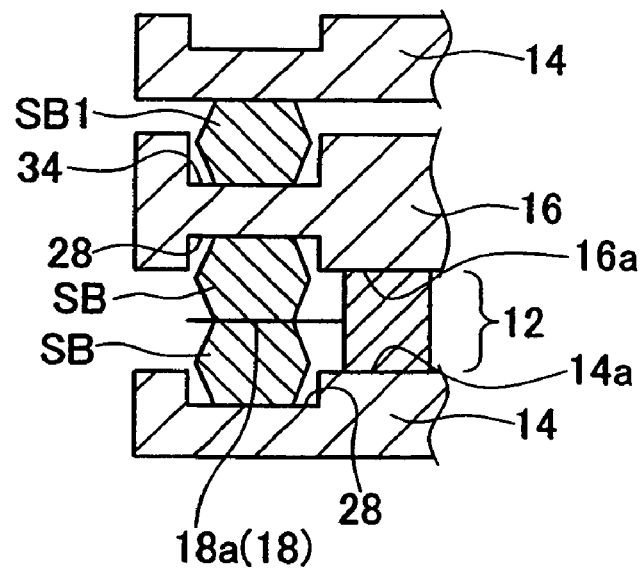

FUEL CELL HAVING SEALANT FOR SEALING A SOLID POLYMER ELECTROLYTE MEMBRANE

RELATED APPLICATIONS

This application is a divisional application of Ser. No. 09/841,895 filed May 2, 2001 now U.S. Pat. No. 6,699,613 B2, date of patent Mar. 2, 2004, which claims priority to Japanese Patent Application No. 2000-133862 filed May 2, 2000, Japanese Patent Application No. 2000-133865 filed May 2, 2000, Japanese Patent Application No. 2000-133866 filed May 2, 2000, and Japanese Patent Application No. 2000-149068 filed May 19, 2000 in Japan. The contents of the aforementioned applications are hereby incorporated by reference.

BACKGROUND OF THE INVENTION

1. Field of the Invention

The present invention relates to a fuel cell comprising a membrane electrode assembly having a solid polymer electrolyte membrane, an anode side gas diffusion electrode disposed at one side of the solid polymer electrolyte membrane, and a cathode side gas diffusion electrode disposed at the other side of the solid polymer electrolyte membrane, and a pair of separators holding the membrane electrode assembly; and to a method for producing the same: In particular, the present invention relates to a fuel cell in which the membrane electrode assembly can be reliably sealed between the separators, and to a method for producing the same.

Further, the present invention relates to a fuel cell in which the peripheries of openings for fuel gas, oxidant gas, and coolant is reliably sealed, and to a method for producing the same.

Further, the present invention relates to a fuel cell stack whose fuel cell units can be easily replaced.

2. Description of the Related Art

In conventional fuel cells, the membrane electrode assembly comprises a solid polymer electrolyte membrane, and an anode side diffusion electrode and a cathode side diffusion electrode which are disposed at both sides of the membrane. The membrane electrode assembly is held by a pair of separators. By supplying fuel gas (for example, hydrogen gas) onto a reaction surface of the anode side diffusion electrode, the hydrogen gas becomes ionized, and moves toward the cathode side diffusion electrode through the solid polymer electrolyte membrane. The electrons produced in this process are extracted to an external circuit, and are utilized as electric energy of a direct current. Since oxidant gas (for example, air which contains oxygen) is supplied to the cathode electrode, water is generated by the reaction of the hydrogen ions, the electrons, and the oxygen.

An example is explained with reference to FIG. 17. In FIG. 17, reference numeral 1 denotes the solid polymer electrolyte membrane. A fuel cell 4 is assembled such that the solid polymer electrolyte membrane 1 is held between gas diffusion electrodes (an anode side diffusion electrode and a cathode side diffusion electrode) 2 and 3. Sheet-type gaskets 5 which have openings corresponding to the reaction faces of the fuel cell 4 are provided at both sides of the fuel cell 4. While the gaskets 5 cover the edges of the fuel cell 4 and press the edges of the fuel cell 4 using outer pressers 6, the fuel cell 4 is held between separators 7 (disclosed in Japanese Unexamined Patent Application. First Publication No. Hei 6-325777).

In the above conventional fuel cell, the gaskets 5 separate the spaces between the separators 7 and the gas diffusion electrodes 2 and 3 from the outside. Therefore, this fuel cell advantageously prevents the leakage of the fuel gas and the oxidant gas, and prevents the mixing of those gases, to thereby achieve efficient electric power generation. Variations in the thickness of the separators 7 and the gas diffusion electrodes 2 and 3 are unavoidable. Therefore, when the gaskets 5 which have varying thicknesses are combined with the separators 7 and the gas diffusion electrodes 2 and 3, the reaction force produced by the gaskets is not uniform. Thus, there is the problem that the sealing between the separators 7 and the gas diffusion electrodes 2 and 3 is not uniform.

Further, the fuel cell has an internal manifold for supplying fuel gas, oxidant gas, and coolant to the anode side diffusion electrode and the cathode side diffusion electrode. The internal manifold has a number of openings through the separators.

An example of the conventional technique will be explained with reference to FIG. 32. Reference numeral 201 denotes a solid polymer electrolyte membrane. The fuel cell 204 is assembled such that the solid polymer electrolyte membrane 201 is held by gas diffusion electrodes (an anode side diffusion electrode and a cathode side diffusion electrode) 202 and 203. The fuel cell 204 is held between separators 205 and 205.

Openings 206 which constitute the internal manifold are formed in the peripheries of the separators 205 holding the fuel cell 204. The oxidant gas, or the fuel gas supplied from the openings 206 reaches the reaction surfaces of the respective fuel cells 204.

To seal the peripheries of the openings 206, a gasket 207 is inserted between the separators 205 and makes contact with the peripheries of the openings 206 (disclosed in Japanese Unexamined Patent Application. First Publication No. Hei 6-96783, and U.S. Pat. No. 4,510,213).

The above-mentioned fuel cell has problems in that the surface pressure of the gasket 207 varies in the peripheries of the openings of the separators 205, and in that a partial bending stress acts in the peripheries of the openings.

Another conventional fuel cell will be explained with reference to FIG. 47. In FIG. 47, reference numeral 301 denotes a solid polymer electrolyte membrane 301. The fuel cell 304 is assembled such that the solid polymer electrolyte membrane 301 is held by gas diffusion electrodes (an anode side diffusion electrode and a cathode diffusion electrode) 302 and 303. The fuel cells 304 are held via carbon plates 305, which are disposed in the peripheries thereof, by separators 306 and 306. The fuel cell units are assembled such that the separators 306 are attached to the fuel cells 304 by two-side adhesive agent sheet 307, and the fuel cell units are stacked to produce the fuel cell stack (disclosed in Japanese Unexamined Patent Application. First Publication No. Hei 9-289029).

That is, the fuel cells 304 and the separators 306 are bound by the two-side adhesive agent sheet 307, and the fuel cell units are thus assembled. Then, the fuel cell units are stacked. However, there is the problem in that, when replacing either the solid polymer electrolyte membrane 301 or the separators 306, the two-sided adhesive agent sheet 307 must be separated, and this takes much labor.

Further, when the two-sided adhesive agent sheet 307 is separated, components other than the replaced component may be deformed.

BRIEF SUMMARY OF THE INVENTION

It is therefore an object of the present invention to provide a fuel cell which can improve the seal between the membrane electrode assembly and the separators, and a method for producing the same.

In the first aspect of the present invention, the fuel cell comprises: a membrane electrode assembly (12) having a solid polymer electrolyte membrane (18), an anode side gas diffusion electrode (an anode electrode 22, and a second gas diffusion layer 26) disposed at one side of the solid polymer electrolyte membrane, and a cathode side gas diffusion electrode (a cathode electrode 20, and a first gas diffusion layer 24) disposed at the other side of the solid polymer electrolyte membrane; a pair of separators (14 and 16) which hold the membrane electrode assembly; a projecting portion (18a) which extends from the solid polymer electrolyte membrane and which projects from the peripheries of the anode side diffusion electrode and the cathode side diffusion electrode; and a seal, provided onto the separators, which was a liquid sealant (S) at the time of application. The sealant makes contact with the projecting portion while the membrane electrode assembly is disposed between the separators.

In the second aspect of the present invention, the seal is provided in grooves (28) formed in the separator.

According to the first and second aspects of the present invention, the liquid sealant (which means liquid or gel sealant) is directly in contact with the projecting portion provided at the periphery of the solid polymer electrolyte membrane, is pressed between the solid polymer electrolyte membrane and the separators, fitting the varying sizes of the seal sections, and maintains gas-tightness between the solid polymer electrolyte membrane and the separators. Therefore, the reaction force produced by the seal is uniform throughout the periphery between the separators and the membrane electrode assembly, thereby making the sealing uniform. The manufacturing sizes of the separators and the membrane electrode assembly in the directions of thickness need not be accurately controlled. Management of the accuracy in size is easy, and manufacturing costs can be reduced.

Further, the liquid sealant compensates for variation in the sizes of the seal sections between the separators and the projecting portion of the solid polymer electrolyte membrane, and therefore prevents partial forces from acting on the separators. Therefore, the separators can be thin, the fuel cell can be light, and the size of the fuel cell can be reduced. The fuel cell of the present invention is suitable for a vehicle in which the space for the fuel cell is limited, and in which it is desirable for the separators to be as thin as possible.

In the third aspect of the present invention, if the diameter of the applied liquid sealant is C, the width e of the projecting portion is equal to or greater than $3/2 \times C$.

According to the third aspect of the present invention, in addition to the above effects, the width of the projecting portion of the solid polymer electrolyte membrane can be at a minimum while achieving a reliable sealing. That is, the projecting portion which does not contribute to the reaction of gases can be minimized while improving the sealing.

In the fourth aspect of the present invention, the a diameter of the applied liquid sealant is equal to or greater than 0.9 mm.

According to the fourth aspect of the present invention, the width of the contact of the liquid sealant is suitable when manufacturing the fuel cell, and the manufacturing process can be simplified.

It is therefore an object of the present invention to provide a fuel cell in which it is possible to improve the sealing in the peripheries of the opening of the separator, and a method for producing the same.

In the fifth aspect of the present invention, the fuel cell comprises: a membrane electrode assembly (12) having a solid polymer electrolyte membrane (18), an anode side diffusion electrode (an anode electrode 22, and a second diffusion layer 26) disposed at one side of the solid polymer electrolyte membrane, and a cathode side diffusion electrode (a cathode electrode 20, and the first diffusion layer 24) disposed at the other side of the solid polymer electrolyte membrane; a pair of separators (14 and 16) which hold the membrane electrode assembly, each of the separators having an opening (36a, 38a, 40a, 40b, 36b, or 38b) for supplying or discharging one of a fuel gas, an oxidant gas, and a coolant to or from the membrane electrode assembly; a seal, which was liquid sealant (SA1) at the time of application, which encloses the openings of the separators, the seal on one separator making contact with the seal on the other separator to seal the periphery of the opening.

In the sixth aspect of the present invention, the separators have grooves (30) which enclose the openings, and the seal is provided in the grooves.

According to the fifth and six aspects of the present invention, the seal is directly in contact with the projecting portion provided at the periphery of the solid polymer electrolyte membrane 18, is pressed between the separators, fitting the varying sizes of the seal sections, and maintains gas-tightness in the peripheries of the openings. Therefore, the reaction force produced by the seal is uniform throughout the peripheries of the openings, thereby making the sealing uniform. The manufacturing sizes of the separators in the direction of thickness need not be accurately controlled. Management of the accuracy in size is easy, and manufacturing costs can be reduced.

In the seventh aspect of the present invention, the fuel cell comprises: a membrane electrode assembly having a solid polymer electrolyte membrane, an anode side diffusion electrode disposed at one side of the solid polymer electrolyte membrane, and a cathode side diffusion electrode disposed at the other side of the solid polymer electrolyte membrane; a pair of separators which hold the membrane electrode assembly, each of the separators having an opening for supplying or discharging one of a fuel gas, an oxidant gas, and a coolant to or from the membrane electrode assembly; and a seal, which was liquid sealant at the time of application, which encloses the openings of one of the separators, and which makes contact with the other separator to seal the periphery of the opening.

In the eighth aspect of the present invention, one of the separators has a groove which encloses the opening, and the seal is provided in the grooves.

The seventh and eighth aspects of the present invention achieves the same effects as those of the fifth and six aspects, and reduces the manufacturing costs because the liquid sealant and the groove are provided only on one of the separators.

It is therefore an object of the present invention to provide a fuel cell stack whose fuel cell units can be easily replaced.

In the ninth aspect of the present invention, the fuel cell stack (N) has a plurality of fuel cell units (10). Each of the fuel cell units (10) comprises: a membrane electrode assembly (12) having a solid polymer electrolyte membrane (18), an anode side diffusion electrode (an anode electrode 22, and a second diffusion layer 26) disposed at one side of the solid polymer electrolyte membrane, and a cathode side diffusion electrode (cathode electrode 20, and a first diffusion layer 24) disposed at the other side of the solid polymer electrolyte membrane; a pair of separators (14 and 16) which hold the membrane electrode assembly; an adhesive seal (SB), provided between the separators, which was liquid sealant at the time of application; and non-adhesive seal (SB1, or KS1) provided between the separator of one fuel cell unit and the separator of the other fuel cell unit.

In the tenth aspect of the present invention, the non-adhesive seal was liquid sealant at the time of application.

In the eleventh aspect of the present invention, the non-adhesive seal was solid sealant at the time of application.

According to the ninth to eleventh aspects of the present invention, the non-adhesive sealant is provided between the separators in the stacked fuel cell units. therefore, when replacing one of the fuel cell units, each of the fuel cell units can be easily disassembled and reassembled. Thus, rebuildability is improved. Because the adhesive seal binds the separators holding the fuel cell, the membrane electrode assembly is prevented from accidentally being separated when disassembling or reassembling the fuel cell stack. Further, the diffusion electrodes and the separators are prevented from being accidentally separated.

BRIEF DESCRIPTION OF THE DRAWINGS

FIG. 41 is a view showing the second example of stacking the parts of the fourth embodiment.

DETAILED DESCRIPTION OF THE INVENTION

The embodiments of the present invention will be explained with reference to the figures.

First Embodiment

Figure 1:
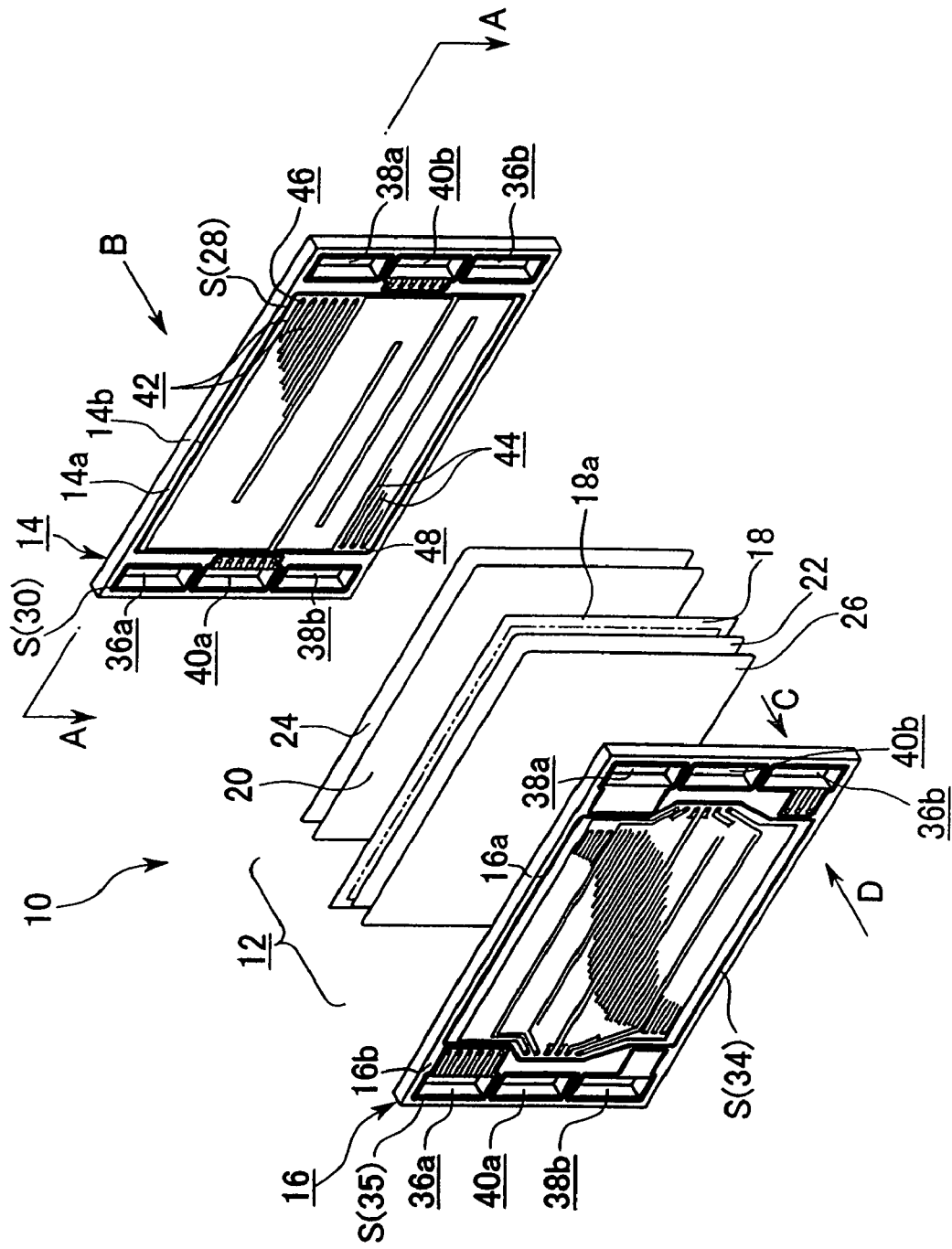
FIG. 1 is an exploded and perspective view showing the first embodiment of the present invention.

FIG. 1 is an exploded perspective view showing the fuel cell of the present invention. The fuel cell unit 10 comprises a membrane electrode assembly 12, and first and second separators 16 holding the fuel cell unit. A fuel cell stack for a vehicle is assembled by stacking a number of fuel cell units 10.

The fuel cell subunit 12 comprises a solid polymer electrolyte membrane 18, and a cathode electrode 20 and an anode electrode 22 which hold both sides of the solid polymer electrolyte membrane 18. Each of the cathode electrode 20 and the anode electrode 22 has a first gas diffusion layer 24 and a second gas diffusion layer 26 which are made of, for example, porous carbon cloth, or porous carbon paper. The solid polymer electrolyte membrane 18 is made of perfluorosulfonic acid polymer. The cathode electrode 20 and the anode electrode 22 are made of Pt. A cathode side diffusion electrode (gas electrode) comprises the cathode electrode 20 and the first gas diffusion layer 24, while an anode side diffusion electrode (gas diffusion electrode) comprises the anode electrode 22 and the second gas diffusion layer 24.

The solid polymer electrolyte membrane 18 has a projecting portion which projects from the edges of the cathode electrode 20 and the anode electrode 22 which hold the solid polymer electrolyte membrane 18. A liquid sealant S applied on the first and second separators 14 and 16 corresponding to the projecting portion 18a is directly in contact with both sides of the projecting portion 18a.

Figure 3:
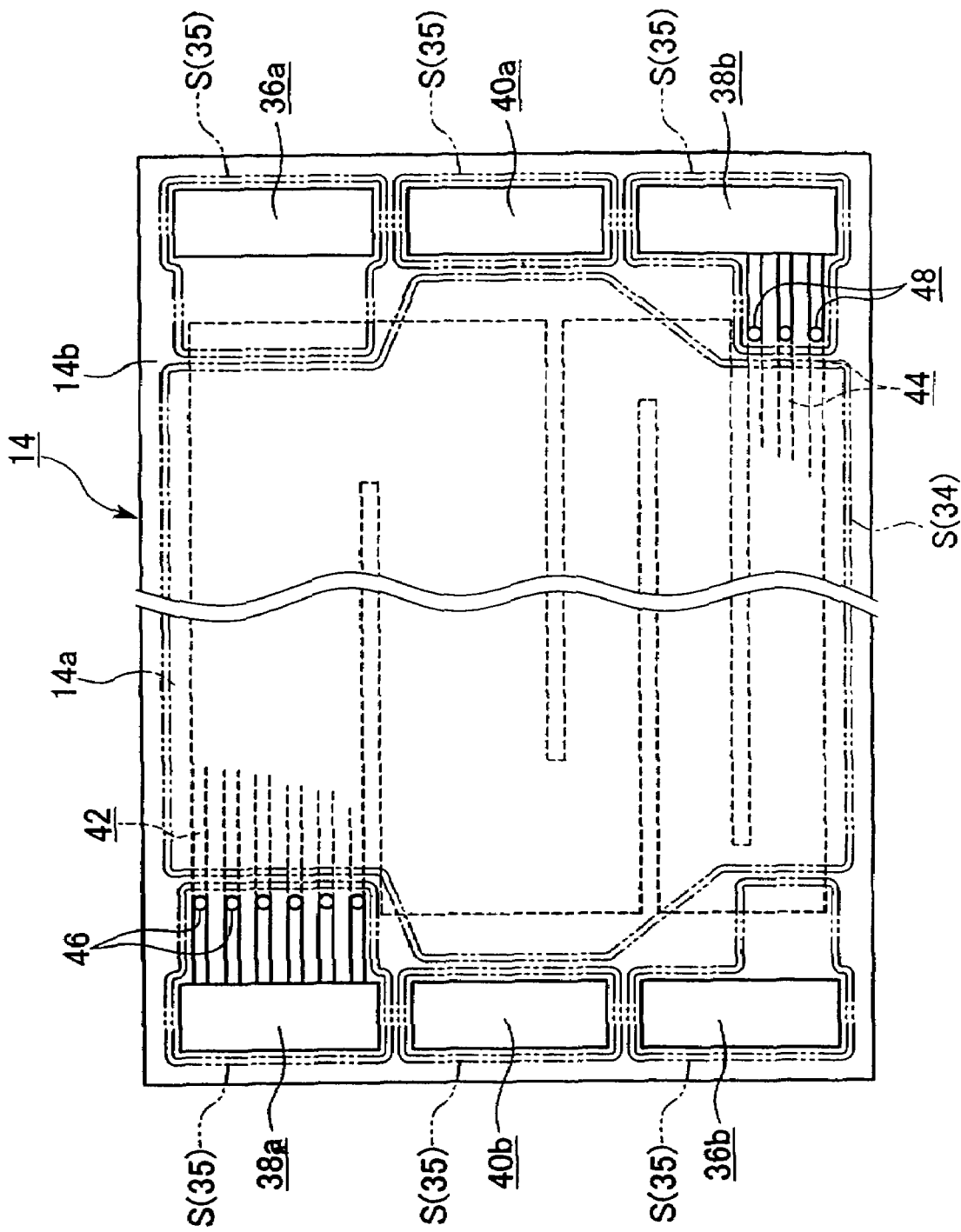
FIG. 3 is a view showing a first separator of the first embodiment from the direction of arrow B in FIG. 1.

As shown in FIG. 3, the first separator 14 has an inlet side fuel gas opening 36a for allowing a fuel gas such as a gas containing hydrogen to pass through, at the upper right end of and close to the edge of the first separator 14, and it has an inlet side oxidant gas opening 38a for allowing an oxidant gas, such as a gas containing oxygen, or air, to pass through, at the upper left end of and close to the edge of the first separator 14.

An inlet side coolant opening 40a which allows coolant, such as pure water, ethylene glycol, or oil, to pass through is provided at the right end in the horizontal direction and in the middle in the vertical direction of the first separator 14. An outlet side coolant opening 40b which allows the used coolant to pass through is provided at the left end in the horizontal direction and in the middle in the vertical direction of the first separator 14.

An outlet side fuel gas opening 36b for allowing the fuel gas to pass through is provided at the lower left end of and close to the edge of the first separator 14, and is disposed diagonally with respect to the inlet side fuel gas opening 36a. An outlet side oxidant gas opening 38b for allowing the oxidant gas to pass through is provided at the lower right end of and close to the edge of the first separator 14, and is disposed diagonally with respect to the inlet side oxidant gas opening 38a.

As shown in FIG. 1, a plurality of, for example, six, independent first oxidant gas channels 42 is formed on a surface 14a opposite the cathode electrode 20 of the first separator 14. They start around the inlet side oxidant gas opening 38a, and run horizontally while meandering vertically downward in the direction of gravity. These first oxidant gas channels 42 join three second oxidant gas channels 44, and the second oxidant gas channels 44 end around the outlet side oxidant gas opening 38b.

As shown in FIG. 3, the first separator 14 has first oxidant gas connecting passages 46 which pass through the first separator 14, whose ends are connected to the inlet side oxidant gas opening 38a on a surface 14b opposite the surface 14a, and whose other ends are connected to the first oxidant gas channels 42 on the surface 14a. Further, the first separator 14 has second oxidant gas connecting passages 48 which pass through the first separator 14, whose ends are connected to the outlet side oxidant gas opening 38b on the surface 14b, and whose other ends are connected to the second oxidant gas channels 44 on the surface 14a.

Figure 4:
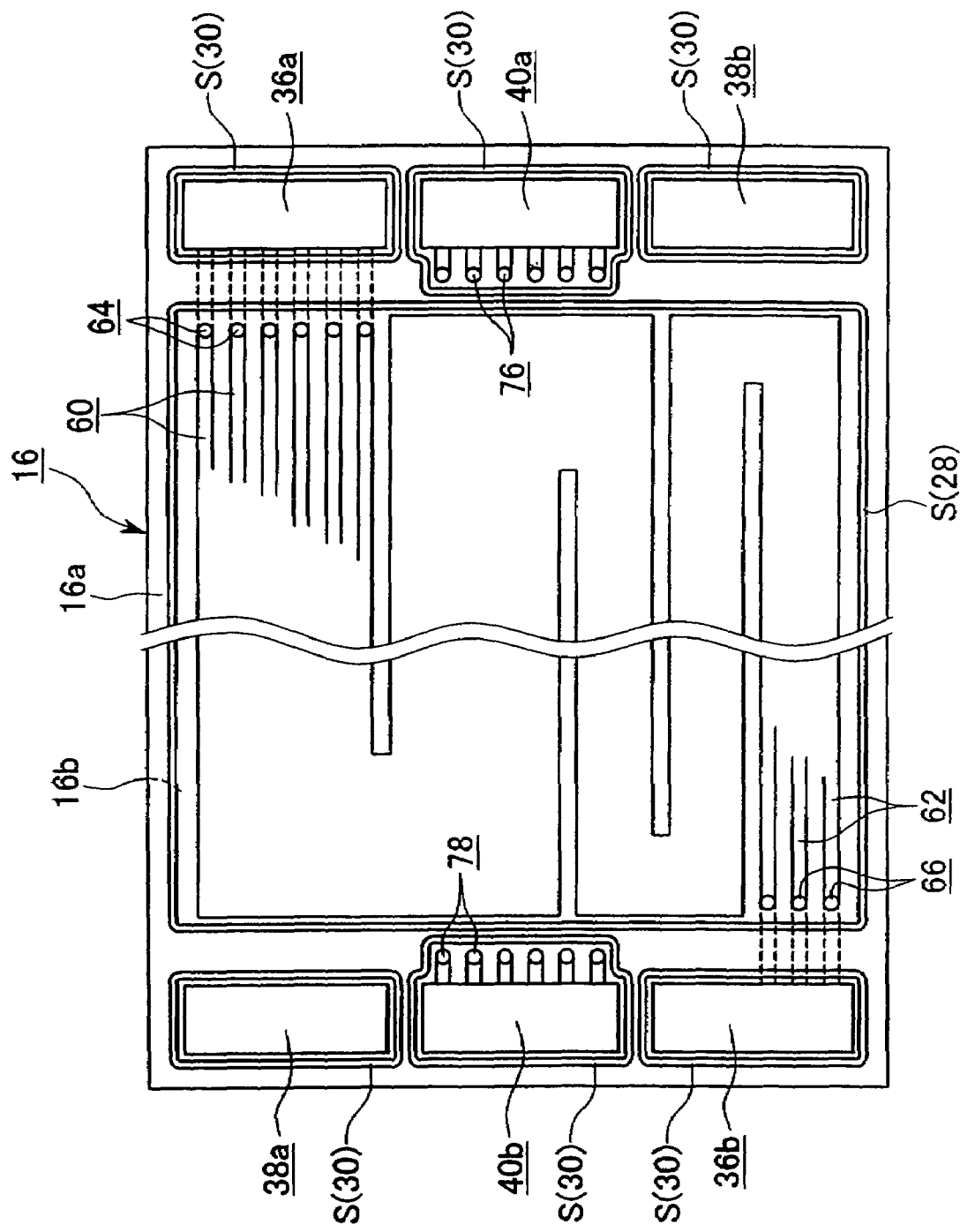
FIG. 4 is a view showing a second separator of the first embodiment from the direction of arrow C in FIG. 1.
Figure 5:
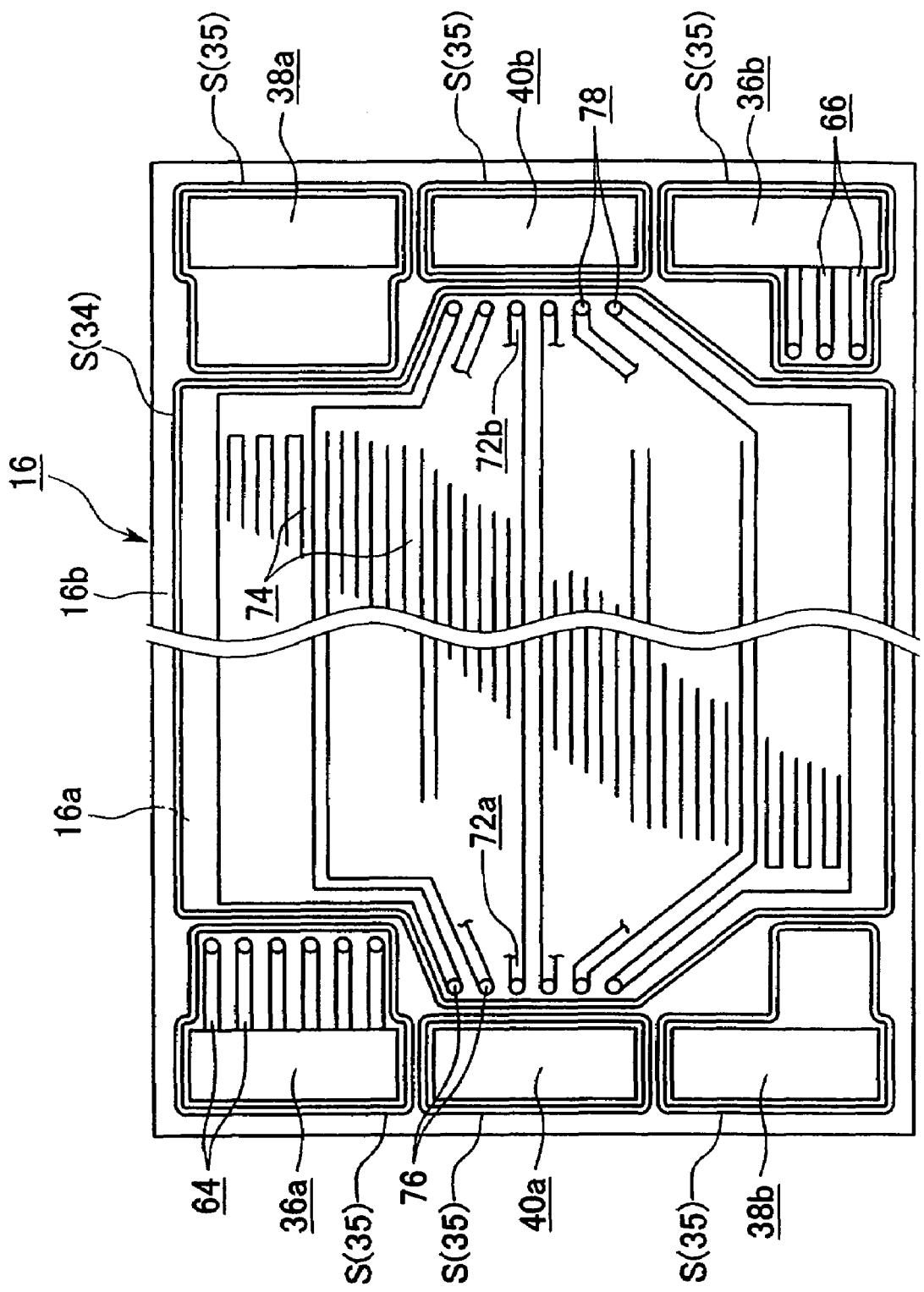
FIG. 5 is a view showing a second separator of the first embodiment from the direction of arrow D in FIG. 1.

As shown in FIGS. 4 and 5, an inlet side fuel gas opening 36a, an inlet side oxidant gas opening 38a, an inlet side coolant opening 40a, an outlet coolant opening 40b, an outlet side fuel gas opening 36b, and an outlet oxidant gas opening 38b, which are disposed at both ends of and close to the edges of the second separator 16, in a manner similar to the openings of the first separator 14.

A plurality of, for example, six, first fuel gas channels 60 are formed on a surface 16a of the second separator 16, and they start around the inlet side fuel gas opening 36a. The first fuel gas channels 60 run horizontally while meandering vertically downward in the direction of gravity, and join three second fuel gas channels 62. The second fuel gas channels 62 end around the outlet side fuel gas opening 36b.

The separator 16 has first fuel gas connecting passages 64 which connect the inlet side fuel gas opening 36a on the surface 16b to the first fuel gas channels 60, and second fuel gas connecting passages 66 which connect the outlet side fuel gas opening 36b on the surface 16b to the second fuel gas channels 62. The passages 64 and 66 pass through the second separator 16.

Figure 2:
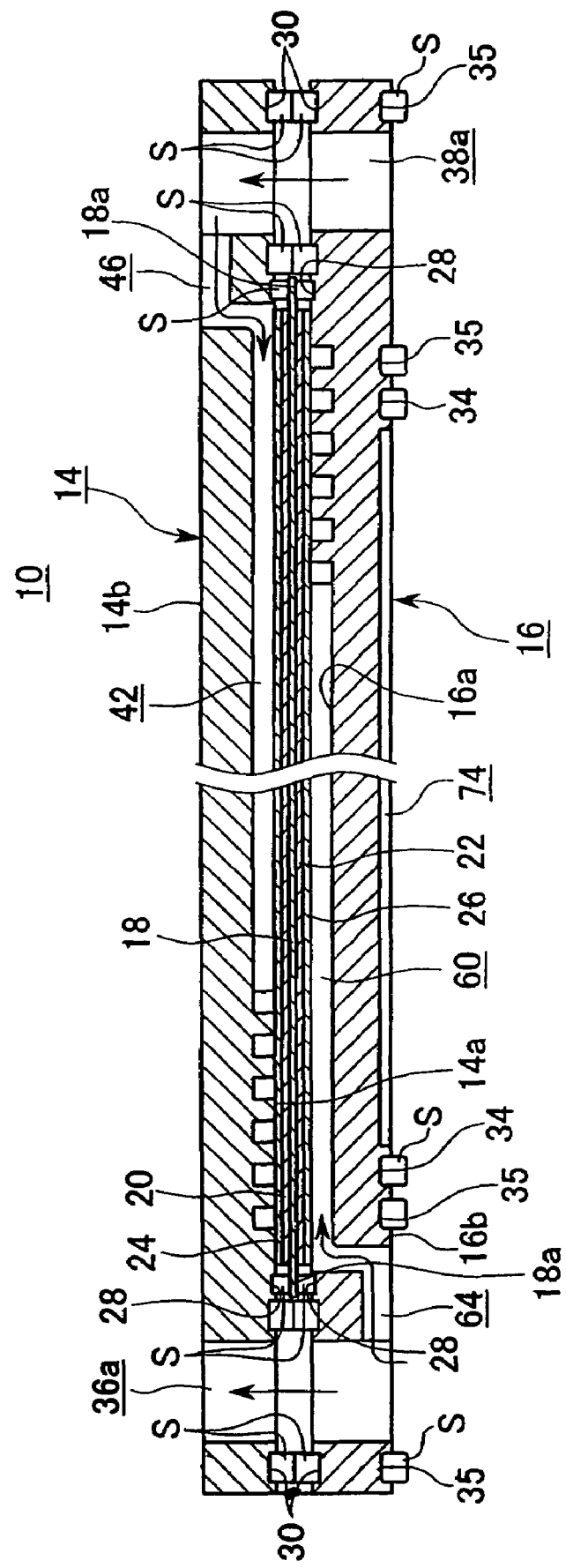
FIG. 2 is a cross-sectional view along the line A-A in FIG. 1.

As shown in FIGS. 2 and 5, a plurality of main channels 72a and 72b which act as coolant channels are formed on the surface 16b of the second separator 16, within the area enclosed by the liquid sealant S, and close to the inlet side coolant opening 40a and the outlet side coolant opening 40b. A plurality of branch channels 74 branch off from the main channels 72a and 72b, and extend in the horizontal direction.

The second separator 16 has first coolant connecting passages 76 which connect the inlet side coolant opening 40a to the main channels 72a, and second coolant connecting passages 78 which connect the outlet coolant opening 40b to the main channels 72b. The passages 76 and 78 pass through the second separator 16.

As shown in FIG. 2, a groove 28 is formed on the surface 16a of the second separator 16, which holds the solid polymer electrolyte membrane 18, opposite the anode electrode 22, and corresponds to the projecting portion 18a of the solid polymer electrolyte membrane 18. The liquid sealant S is put into the groove 28. Further, grooves 30 enclose the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b which are on the surface 16a of the second separator 16. The liquid sealant S is put into the grooves 30. The grooves 30 around the inlet side coolant opening 40a and the outlet side coolant opening 40b enclose the first and second coolant connecting passages 76 and 78.

Figure 6:
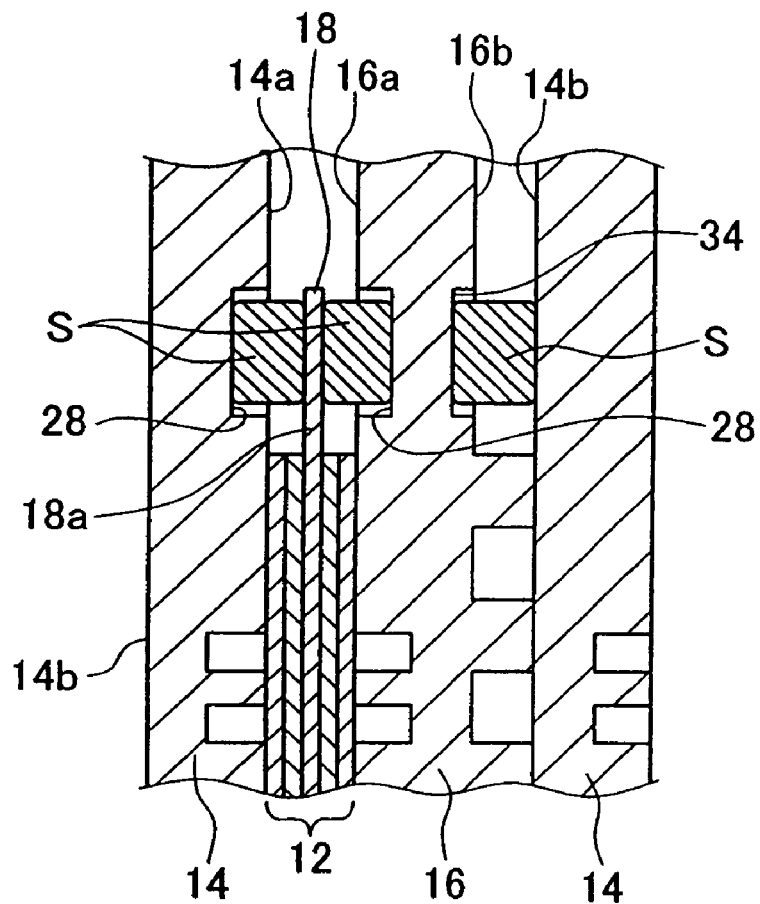
FIG. 6 is an enlarged view showing the main part of FIG. 2.
Figure 7:
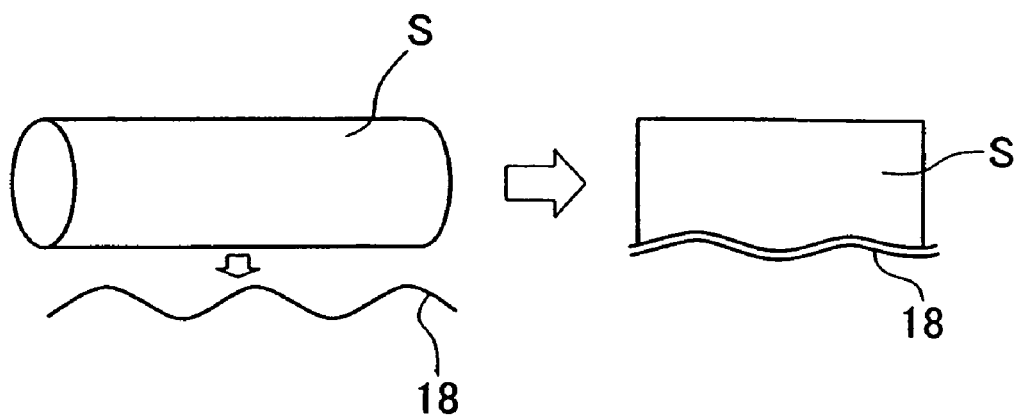
FIG. 7 is a view showing the solid polymer electrolyte membrane and the liquid sealant of the first embodiment.

As shown in FIG. 1, grooves 28 and 30 are formed on the surface 14a of the first separator 14, which holds the fuel cell subunit 12 with the second separator 16, opposite the cathode electrode 20, and correspond to the grooves 28 and 30 on the second separator 16. The liquid sealant S is put into these grooves 28 and 30. As shown in FIGS. 2 and 6, the liquid sealant S is put into the grooves 28 and 30 of the first and second separators 14 and 16 holding the fuel cell subunit 12. The liquid sealant S in the grooves 28 makes direct contact with both sides of the projecting portion 18a, thereby sealing the periphery of the fuel cell subunit 12. The liquid sealant S in one groove 30 makes contact with the liquid sealant S in the other groove 30, thereby sealing the periphery of the openings 36a, 36b, 38a, 38b, 40a, and 40b.

As shown in FIG. 5, a groove 34 encloses the branch channels 74 on the surface 16b of the second separator 16, opposite the surface 14b of the first separator 14 when a plurality of fuel cells are stacked. The liquid sealant S is put into the groove 34. Further, grooves 35 enclose the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b. The liquid sealant S is put into the grooves 35.

The grooves 35 around the inlet side fuel gas opening 36a and the outlet side fuel gas opening 36b enclose the first fuel gas connecting passages 64 and the second fuel gas connecting passages 66. The grooves around the inlet side oxidant gas opening 38a and the outlet side oxidant gas opening 38b enclose the inlet side oxidant gas opening 38a and the outlet side oxidant gas opening 38b on the surface 14b of the first separator 14.

When the fuel cell units 10 are stacked, the surface 14b of the first separator 14 contacts the surface 16b of the second separator 16. Then, the liquid sealant S of the second separator 16 arranged around the inlet side fuel gas opening 36a, the inlet side oxidant gas opening 38a, the inlet side coolant opening 40a, the outlet side coolant opening 40b, the outlet side fuel gas opening 36b, the outlet side oxidant gas opening 38b, and the branch channels 74 is in contact with the surface 14b of the first separator 14, and thereby ensures watertightness between the first separator 14 and the second separator 16.

The liquid sealant S is made of a thermosetting fluorine-containing material or thermosetting silicon. The liquid sealant S has viscosity such that the cross-sectional shape of the sealant does not vary after it has been put into the grooves, and hardens into solid sealant while maintaining a certain degree of elasticity even after the seal has been formed. The sealant may be adhesive, or may not be adhesive. Preferably, those liquid sealant S used between replaceable parts, such as the surface 14b of the first separator 14 and the surface 16b of the second separator 16, are not adhesive. Specifically, the diameter of the applied liquid sealant S is 0.6 mm, and the load on the sealant is 0.5 to 2 N/mm (when this is below 0.5 N/mm, the sealing performance is degraded, and when it is above 2 N/mm, the seal loses elasticity). The widths of the grooves 28, 30, 34, and 35 are 2 mm, and their depths are 0.2 mm. The liquid sealant S put into the grooves 28, 30, 34, and 35 is pressed such that the cross-sectional area of the sealant is increased, thereby compensating for variation in the sizes of the seal sections, and making regular contact with the seal sections.

Figure 8:
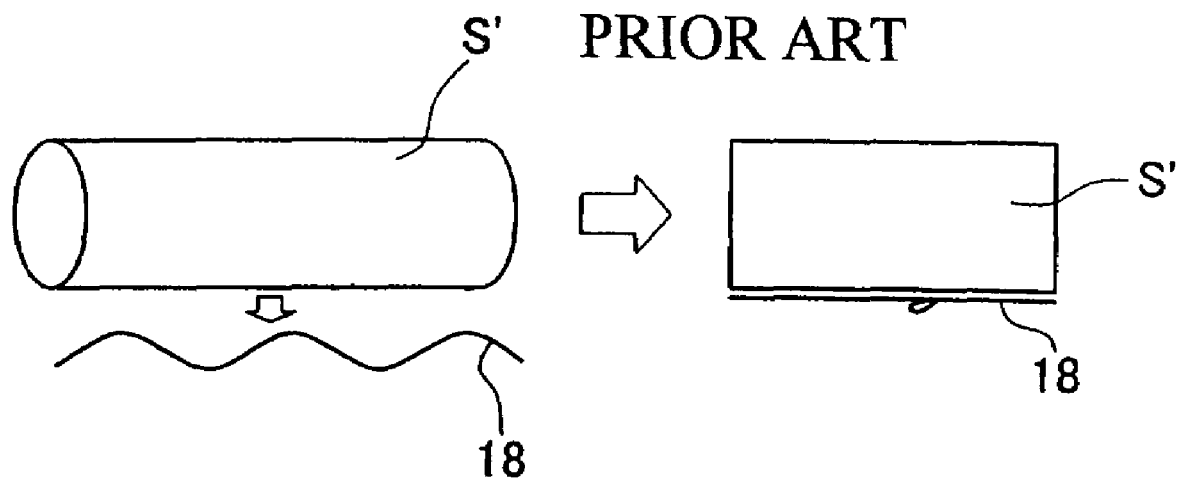
FIG. 8 is a view showing the conventional technique.

More specifically, as shown in FIG. 8, the solid sealant S' makes close contact with the solid polymer electrolyte membrane 18. When the solid sealant S' is pressed onto the solid polymer electrolyte membrane 18 and is compressed, the seal may be degraded due to the unevenness of the sealant S' because the solid polymer electrolyte membrane 18 does not evenly slide in the horizontal direction. However, the compressed liquid sealant S does not cause unevenness in the solid polymer electrolyte membrane 18. The liquid sealant S is variably pressed according to the wrinkles of the solid polymer electrolyte membrane 18, and achieves a reliable seal.

Figure 9:
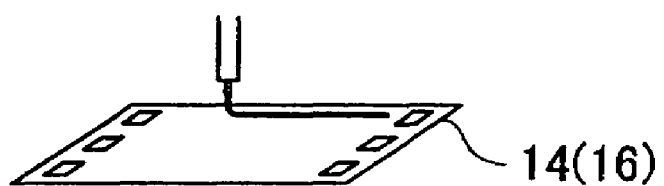
FIG. 9 is a view showing step of manufacturing the first embodiment.
Figure 10:
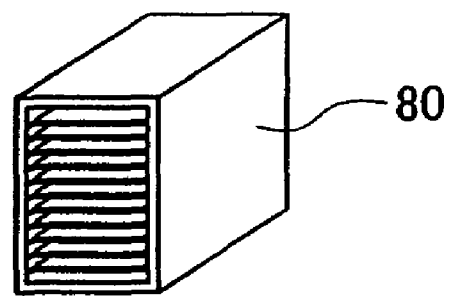
FIG. 10 is a view showing step of manufacturing the first embodiment.
Figure 11:
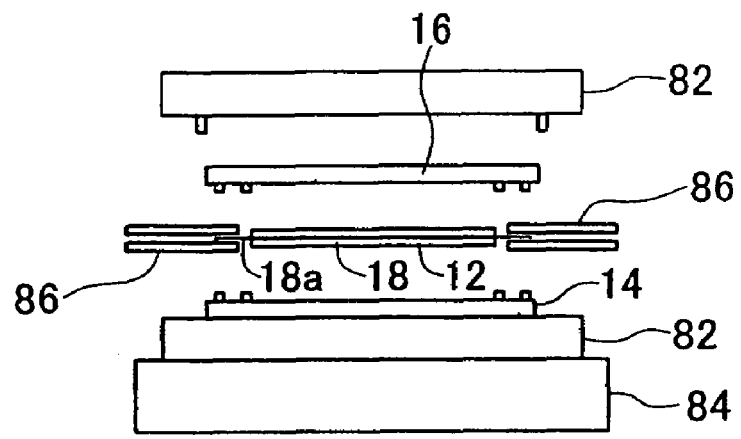
FIG. 11 is a view showing step of manufacturing the first embodiment.

The method for manufacturing the fuel cell unit 10 will be explained with reference to FIGS. 9 to 16. As shown in FIG. 9, the liquid sealant S is put into the grooves 28 and 30 on the surface 14a of the first separator 14, and into the grooves 28 and 30 of the second separator 16. After the application of the liquid sealant S, the first and second separators 14 and 16 are stored into a storage rack 80 shown in FIG. 10 for conveyance and storage. Then, as shown in FIG. 11, the first separator 14 and the second separator 16 hold the assembled fuel cell subunit 12 therebetween. Those parts are inserted between two pressers 82. The lower presser 82 is movable in the vertical direction by means of an automatic lift 84.

Supporters 86 support the edges of the fuel cell subunit 12, and adjust the positions of the first separator 14 and the second separator 16 in the horizontal direction.

Then, the lower presser 82 is raised so that the fuel cell subunit 12 is held between the first separator 14 and the second separator 16 while the liquid sealant S in the grooves 28 makes close contact with the projecting portion 18a of the solid polymer electrolyte membrane 18. At that time, the liquid sealant S in one groove 30 makes close contact with the liquid sealant S in the other groove 30, thus sealing the reaction face, and the periphery of the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b.

Figure 12:
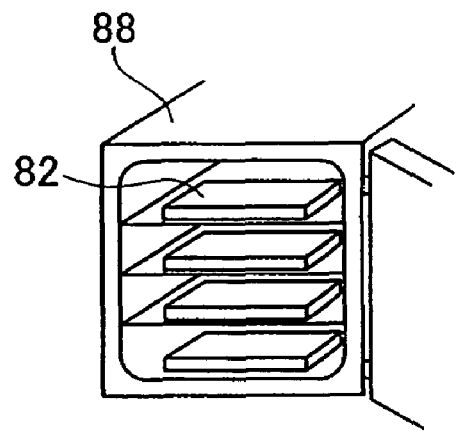
FIG. 12 is a view showing step of manufacturing the first embodiment.
Figure 13:
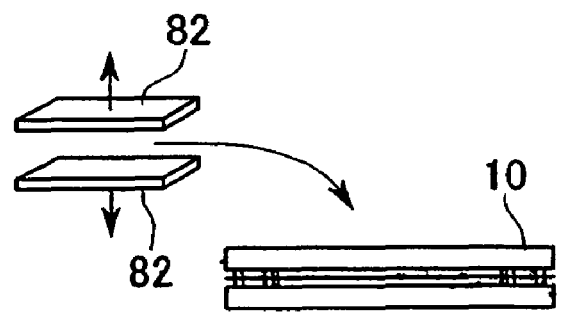
FIG. 13 is a view showing step of manufacturing the first embodiment.
Figure 14:
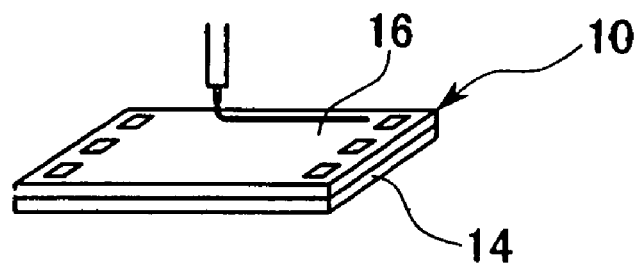
FIG. 14 is a view showing step of manufacturing the first embodiment.
Figure 15:
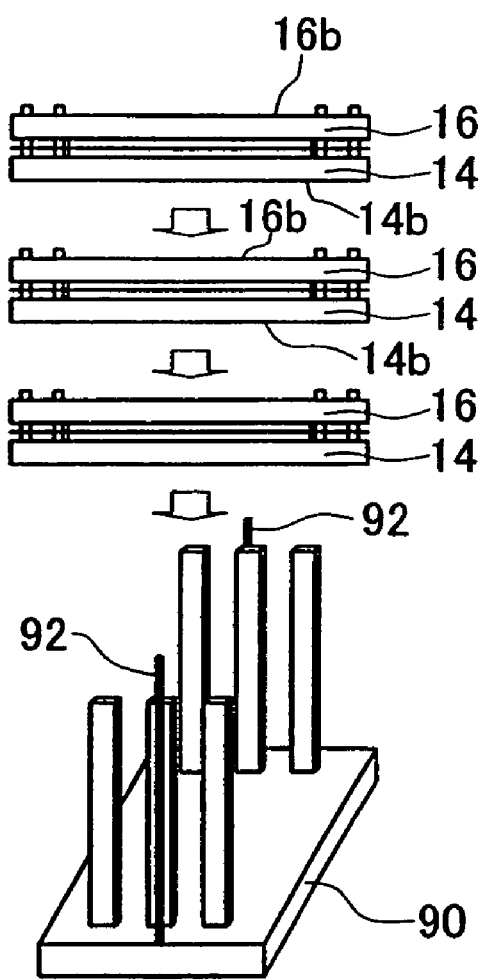
FIG. 15 is a view showing step of manufacturing the first embodiment.

Then, as shown in FIG. 12, the fuel cell subunit 12 which is held between the first separator 14 and the second separator 16 is heated with the pressers 82 by an oven 88 to harden the liquid sealant S. Then, as shown in FIG. 13, the fuel cell subunit 12, the first separator 14, and the second separator 16 are released from the pressers 82, and are cooled down. Then, as shown in FIG. 14, liquid sealant S is put into the grooves 34 and 35 on the surface 16b of the second separator 16 of the fuel cell unit 10. Then, as shown in FIG. 15, the surface 14b of the first separator 14 of another fuel cell unit 10 is stacked onto the surface 16b of that second separator 16. A number of fuel cell units 10 are successively stacked onto an end plate 90 of the fuel cell stack. When a predetermined number of the fuel cell units 10 has been stacked, another end plate is attached by tightening bolts 92. Thus, the fuel cell stack is produced.

The operation of the fuel cell of the first embodiment will now be explained below.

The fuel gas, for example, a gas which contains hydrogen obtained by reforming a hydrocarbon, is supplied to the fuel cell unit 10, while the oxidant gas, for example, air or a gas which contains oxygen, (hereinafter simply referred to as the air) is supplied to the fuel cell. Further, the coolant is supplied to cool down the electrically active surface. As shown in FIG. 2, the fuel gas is supplied into the inlet side fuel gas opening 36a, flows from the surface 16b through the first fuel gas connecting passages 64 to the surface 16a, and reaches the first fuel gas channels 60 on the surface 16a.

The fuel gas supplied to the first fuel gas channels 60 runs horizontally while meandering vertically downward on the surface 16a of the second separator 16 in the direction of gravity. During this travel, the hydrogen gas in the fuel gas is supplied through the second gas diffusion layer 26 to the anode side electrode 22 of the fuel cell subunit 12. The fuel gas moves through the first fuel gas channels 60 to the anode side electrode 22. The fuel gas is introduced through the second fuel gas channels 62 into the second fuel gas connecting passage 66, reaches the surface 16b, and is discharged through the outlet side fuel gas opening 16b shown in FIG. 1.

The air supplied into the inlet side oxidant gas opening 38a in the fuel cell stack 10 is introduced through the first oxidant gas connecting passages 46, which communicates with the inlet side oxidant gas opening 38a of the first separator 14, into the first oxidant gas channels 42. While the air supplied into the first oxidant gas channels 42 moves horizontally while meandering vertically downward in the direction of gravity, the oxygen-containing gas in the air is supplied through the first gas diffusion layer 24 to the cathode side electrode 20. On the other hand, the gas which has not yet been used is discharged through the second oxidant gas channels 44, the second oxidant gas connecting passages 48, and the outlet side oxidant gas opening 38b shown in FIG. 1. Thus, the electric energy is generated in the fuel cell unit 10, and is supplied to a motor which is not shown.

Further, the coolant supplied to the fuel cell unit 10 is introduced into the inlet side coolant opening 40a shown in FIG. 1, and is supplied through the first coolant connecting passages 76 of the second separator 16 to the main channels 72a on the surface 16b as shown in FIG. 5. The coolant travels through a plurality of branch channels 74 branched from the main channels 72a while cooling down the electrically active surface of the fuel cell subunit 12, and reaches the main channels 72b. Then, the used coolant is discharged through the second coolant connecting passages 78, and the outlet side coolant opening 40b.

According to the above embodiment, the liquid sealant S is directly in contact with the projecting portion 18a provided at the periphery of the solid polymer electrolyte membrane 18, is pressed between the solid polymer electrolyte membrane 18 and the first and second separators 14 and 16, fitting the varying sizes of the seal sections, and maintains gas-tightness between the solid polymer electrolyte membrane 18 and the first and second separators 14 and 16 while maintaining even pressure on the grooves 28, 30, 34, and 35. Therefore, the reaction force produced by the sealing is uniform throughout the periphery between the first and second separators 14 and 16 and the fuel cell subunit 12, thereby making the seal uniform.

Particularly, the fit of the liquid sealant S to the varying sizes of the seal sections is satisfactory. Therefore, the manufacturing sizes of the first separator 14, the second separator 16, and the fuel cell subunit 12 in the directions of thickness need not be accurately controlled. Management of the accuracy in size is easy, and manufacturing costs can be reduced.

Further, the liquid sealant put into the grooves of the first separator 14 and the second separator 16 maintains a regular width within the grooves 28, while making close contact with the projecting portion 18a of the solid polymer electrolyte membrane 18, and being pressed according to the sizes of the seal sections. Thus, gas-tightness can be achieved simply by holding the fuel cell subunit 12 with the first separator 14 and the second separator 16. That is, because the cross-sectional area of the liquid sealant S within the grooves 28 is larger than that in the case in which the grooves 28 are not provided, the elastic deformation is also greater. Since there is sufficient deformation, the sealing is improved.

The liquid sealant S compensates for the variation in the sizes of the seal sections between the first and second separators 14 and 16 and the projecting portion 18a of the solid polymer electrolyte membrane 18, and therefore prevents the partial forces from acting on the separators 14 and 16. Therefore, the separators 14 and 16 can be thin, the fuel cell can be light, and the size of the fuel cell can be reduced. The fuel cell of the present invention is suitable for a vehicle in which the space for the fuel cell is limited, and in which it is desirable for the separators 14 and 16 to be as thin as possible.

Because the liquid sealant S makes direct contact with the solid polymer electrolyte membrane 18, the number of parts and the number of assembling steps can be advantageously reduced, as compared with the case in which a frame is attached to the periphery of the fuel cell subunit 12. The surface pressures of the liquid sealant S onto the solid polymer electrolyte membrane 18 are uniform, and therefore the force acting on the solid polymer electrolyte membrane 18 is not partial. Even when the solid polymer electrolyte membrane 18 develops wrinkles, the liquid sealant S can be accordingly pressed, and therefore prevents the wrinkles of the solid polymer electrolyte membrane 18.

The liquid sealant S, which has been put into the grooves 28, 30, 34, and 35, is pressed and the cross-sectional areas thereof are enlarged according to the shapes of the grooves. Thus, the variations in the surface pressure with respect to the extent of compression of the liquid sealant S can be reduced. Namely, the differences in stress between the liquid sealant S due to the varying sizes of the seal sections can be reduced.

Figure 16:
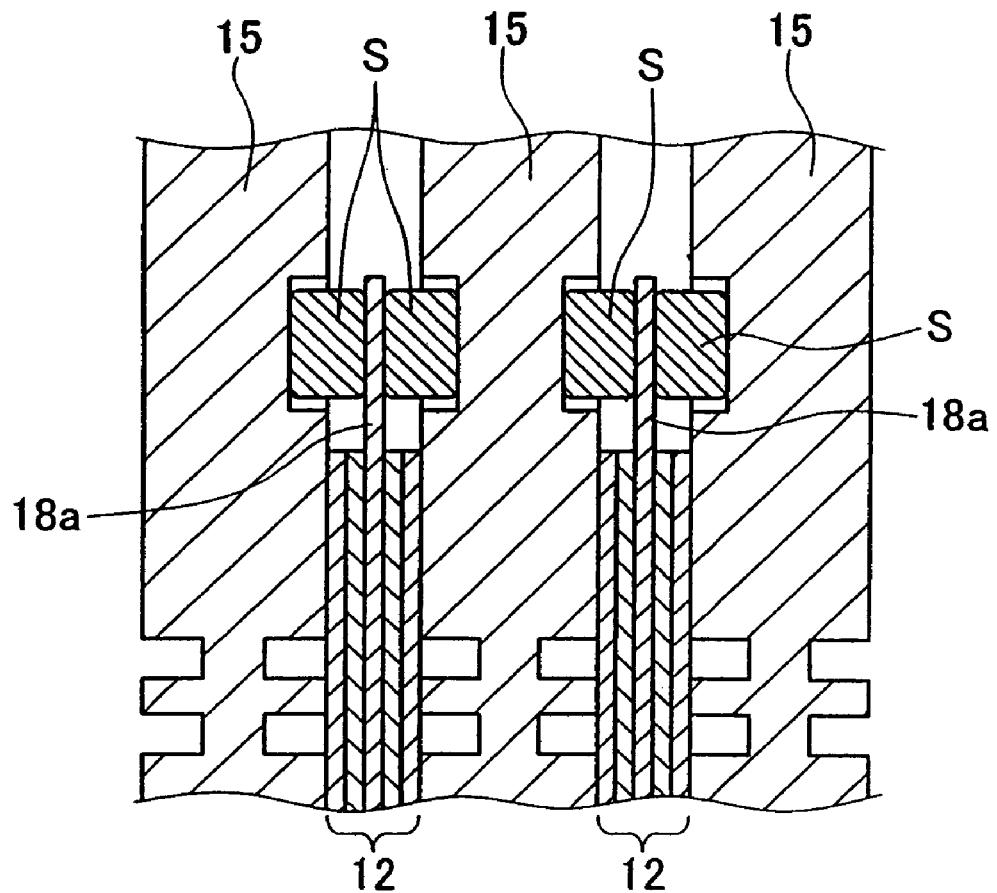
FIG. 16 is a view showing a modification of the present invention, which corresponds to FIG. 6.
Figure 17:
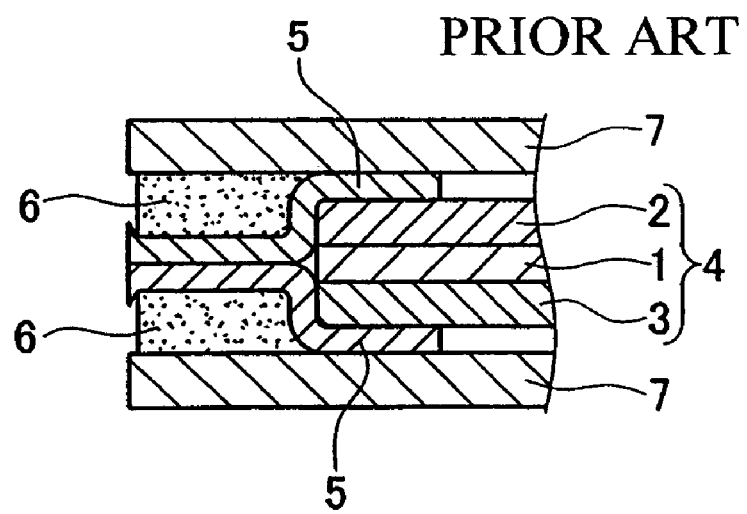
FIG. 17 is a cross-sectional view showing a conventional technique.

The present invention is not limited to the above embodiment and, for example, is also applicable to a fuel cell unit in which, as shown in FIG. 16, three separators 15 are used to hold two sets of fuel cell subunits therebetween.

Second Embodiment

Next, the second embodiment of the present invention will be explained with reference to the drawings. The structure of the fuel cell of the second embodiment is similar to that of the first embodiment, and therefore the differences will be mainly discussed.

The liquid sealant S is made of thermosetting fluorine-containing material or thermosetting silicon. The liquid sealant S has viscosity (in the range of 1000 to 9000 Pa·s, for example, 5000 Pa·s) such that the cross-sectional shape of the sealant does not vary after it has been put into the grooves, and hardens while maintaining a certain degree of elasticity even after the sealant has been formed. The sealant may be adhesive, or may not be adhesive. When the viscosity is below 1000 Pa·s, the shapes of the applied liquid seals cannot be maintained, while when it is above 9000 Pa·s, the viscosity is so high that the sealants cannot be applied.

Preferably, the liquid sealant S disposed between replaceable parts, such as the surface 14b of the first separator 14 and the surface 16b of the second separator 16, is not adhesive. Specifically, the diameter of the applied liquid sealant S is 0.2 to 6 mm, and is preferably 0.4 to 4 mm, for example, 0.6 mm. The load on the sealant is 0.5 to 2 N/mm (when this is below 0.5 N/mm, the sealing performance is degraded, and when it is above 2 N/mm, the seal loses elasticity). Therefore, the diameter of the applied sealant is set as described above because, when the diameter is below 0.2 mm, the liquid sealant S may be cut because of the high viscosity, and because, when it is above 6 mm, the force required to bind the stacked separators is too high.

The widths of the grooves 28, 30, 34, and 35 are 2 mm, and their depths are 0.2 mm. The liquid sealant S put into the grooves 28, 30, 34, and 35 is pressed such that the cross-sectional area of the sealant is increased, thereby compensating for variation in the sizes of the seal sections, and making regular contact with the seal sections.

Figure 18:
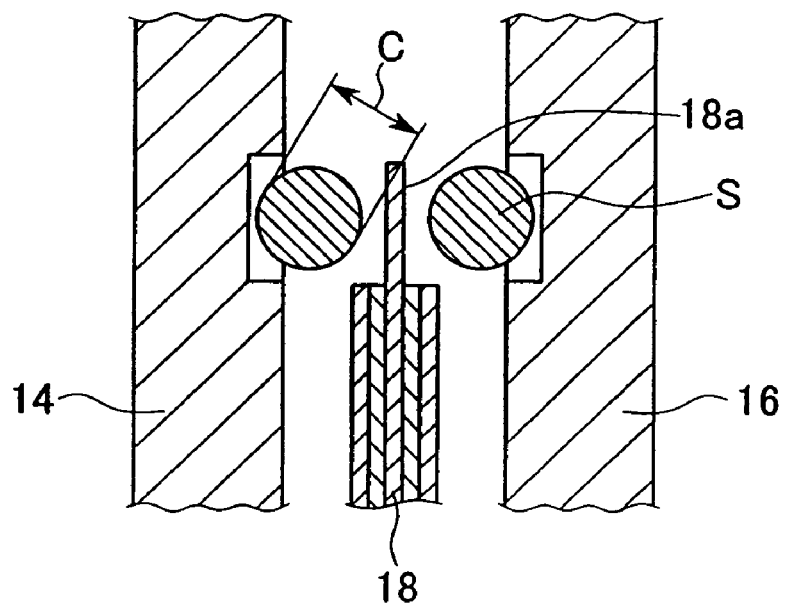
FIG. 18 is a cross-sectional view showing the second embodiment in which the liquid sealant is applied onto the membrane electrode assembly.
Figure 19:
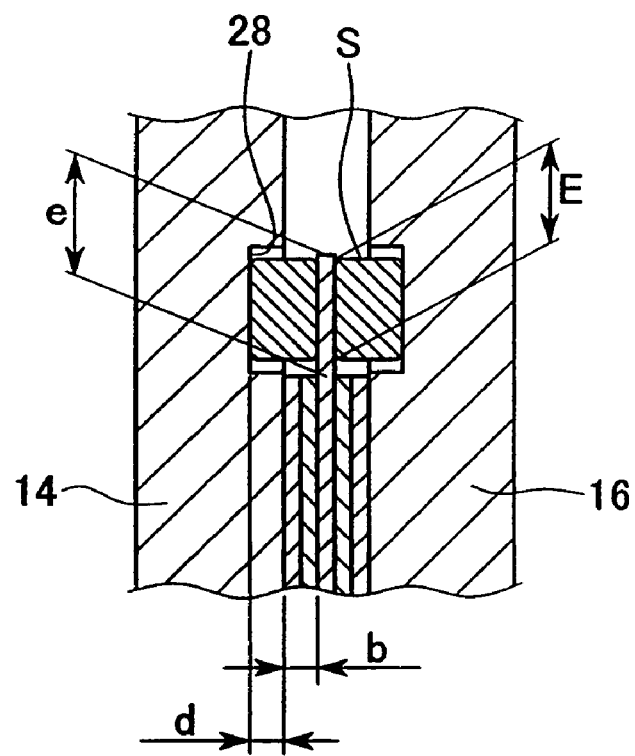
FIG. 19 is a cross-sectional view showing the second embodiment in which the membrane electrode assembly is held by the separators.

As shown in FIG. 18, the liquid sealant S which makes close contact with the projecting portion 18a of the solid polymer electrolyte membrane 18 has a round shape with the diameter C (=0.6 mm). When as shown in FIG. 19 the fuel cell subunit 12 is held between the first and second separators 14 and 16, the liquid sealant S is pressed, and the pressed portion makes close contact with the whole area of the projecting portion 18a of the solid polymer electrolyte membrane 18.

If the contact of the liquid sealant S is too wide, the projecting portion 18a must be larger, and increases the extra area of the solid polymer electrolyte membrane 18 which does not contribute to the reaction, thereby increasing the costs. If the contact of the liquid sealant S is too narrow, the sealing is insufficient.

In the embodiment, when the diameter of the applied liquid sealant S is C, the width e of the projecting portion 18a is set to 3/2×C, thereby ensuring the sealing.

The experiment was carried out to demonstrate the sealing performance using test pieces for gas sealing. As shown in FIG. 19, in the experiment, the diameter of the applied liquid sealant S is C (=0.6 mm) which is the minimum diameter to uniformly apply the liquid sealant S, the depth of the groove 28 is d, and the width of the cathode electrode 20 and the first diffusion layer 24 is b (which is the same as the width of the anode side). In the experiment, variations of the length of b+d were prepared. Further, the liquid sealant S is a thermosetting fluorine-containing material with a viscosity of 5000 Pa·s.

Figure 20:
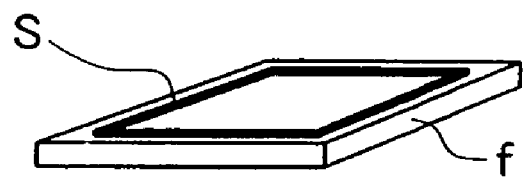
FIG. 20 is a perspective view showing a tool used in the experiment of the second embodiment.
Figure 21:
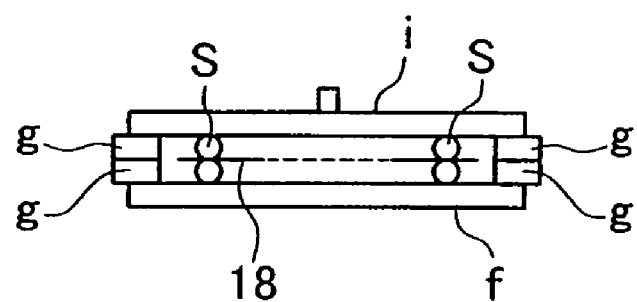
FIG. 21 is a view showing the set tool for the experiment of the second embodiment.
Figure 22:
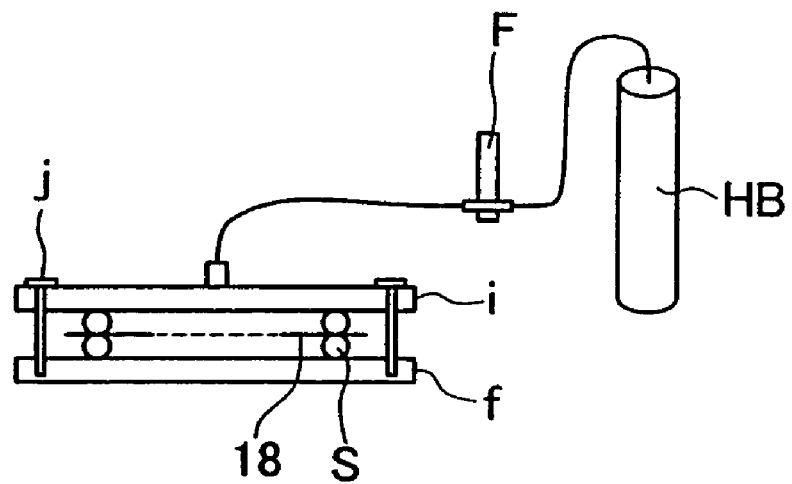
FIG. 22 is a view showing the experiment of the second embodiment.

As shown in FIGS. 20 and 22, the liquid sealant S of the thermosetting fluorine-containing material with the diameter of 0.6 mm is directly put onto the surfaces of a tool which comprises a plate f made of stainless steel (SUS316) and of a plate i made of stainless steel (SUS316) which has an opening for pressurizing a gas. Then, as shown in FIG. 21, the solid polymer electrolyte membrane 18 which has an opening at its center is held between the applied liquid sealants S, and the spacers g (films, or steel plates) for adjusting the space (corresponding to b+d) are also inserted in the periphery of the tool. Then, the liquid sealant S is heated for two hours at 150° C. so that it hardens into a solid sealant (solid seal).

Then, as shown in FIG. 22, the spacers g are removed after the liquid sealant S has hardened. Then, the load of 1 N/mm is given to the sealant, and the test piece is fixed by bolts j while maintaining the load. Then, the test piece is connected to a pipe from a helium gas cylinder HB at a room temperature in the atmosphere, and is pressurized at the gas pressure of 200 kPa. The leakage of the gas is measured by a flowmeter F.

The solid polymer electrolyte membrane 18 has the outside dimension of 420×420 mm, the opening with the inside diameter of 300×300 mm, and the thickness of 50 μm, and is made of perfluorosulfonic acid polymer.

The leakage of gas when the width E of the contact of the liquid sealant S shown in FIG. 19 is varied by varying the thickness (μm) of the spacer g are shown in Table 1.

TABLE 1

| One Side of Space (Spacer Thickness g) (μm) | Width of Contact Between Sealant and Membrane (mm) | Gas Leakage (cc/min) |
| --- | --- | --- |
| 60 | 4.7 | 0 |
| 110 | 2.5 | 0 |
| 160 | 1.8 | 0 |
| 210 | 1.3 | 0 |
| 260 | 1.1 | 0 |
| 310 | 0.9 | 0 |
| 360 | 0.8 | 3 |
| 410 | 0.7 | 8 |

According to the results of the experiment, when the width E of the contact of the liquid sealant S is equal to or greater than 0.9 mm, which is at least 3/2 of the diameter of the applied liquid sealant S, the gas leakage is zero. Therefore, the width e (the minimum value e=E) of the projecting portion 18a of the solid polymer electrolyte membrane 18 should be set such that the liquid sealant S has the width E of the contact.

In the manufacturing process, the liquid sealant S with the diameter C is put into the grooves 28 in the peripheries of the first separator 14 and the second separator 16. The liquid sealant S which has not yet hardened makes close contact with the projecting portion 18a (with the width e) of the solid polymer electrolyte membrane 18 while the fuel cell subunit 12 is held between the separators 14 and 16. The liquid sealant S is pressed between the separators 14 and 16 such that the width E of the contact of the liquid sealant S with the solid polymer electrolyte membrane 18 becomes equal to or greater than 3/2 of the diameter C of the applied liquid sealant S. Then, the fuel cell subunit 12, the first separator 14, and the second separator 16 are heated to harden the liquid sealant S. The width E of the contact of the liquid sealant S can be adjusted by inserting the spacers between the separators 14 and 16. This method can suitably adjust the width E of the contact of the liquid sealant S, thereby simplifying the manufacturing process.

Further, the width e of the projecting portion 18a of the solid polymer electrolyte membrane 18 with which the liquid sealant S makes contact is suitable with respect to the diameter C of the applied liquid sealant S, and thereby the sealing is reliable while the projecting portion 18a is minimum.

Further, the second embodiment achieves the same effects as those of the first embodiment.

Third Embodiment

Next, the third embodiment of the present invention will now be explained with reference to the drawings. The structure of the fuel cell of the third embodiment is similar to that of the first embodiment, and therefore the differences will be mainly discussed.

Figure 26:
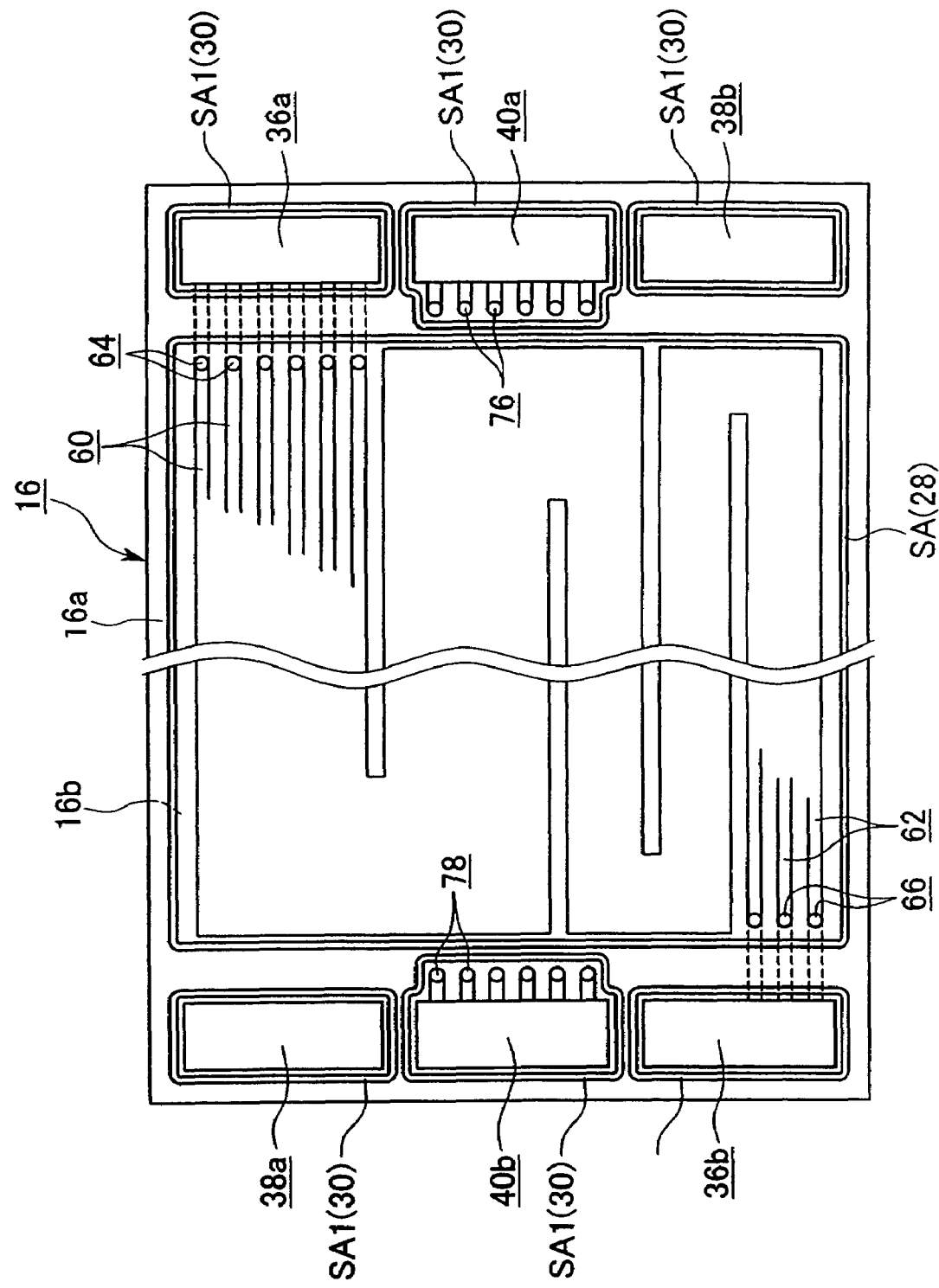
FIG. 26 is a view showing a second separator of the first embodiment from the direction of arrow C in FIG. 23.
Figure 28:
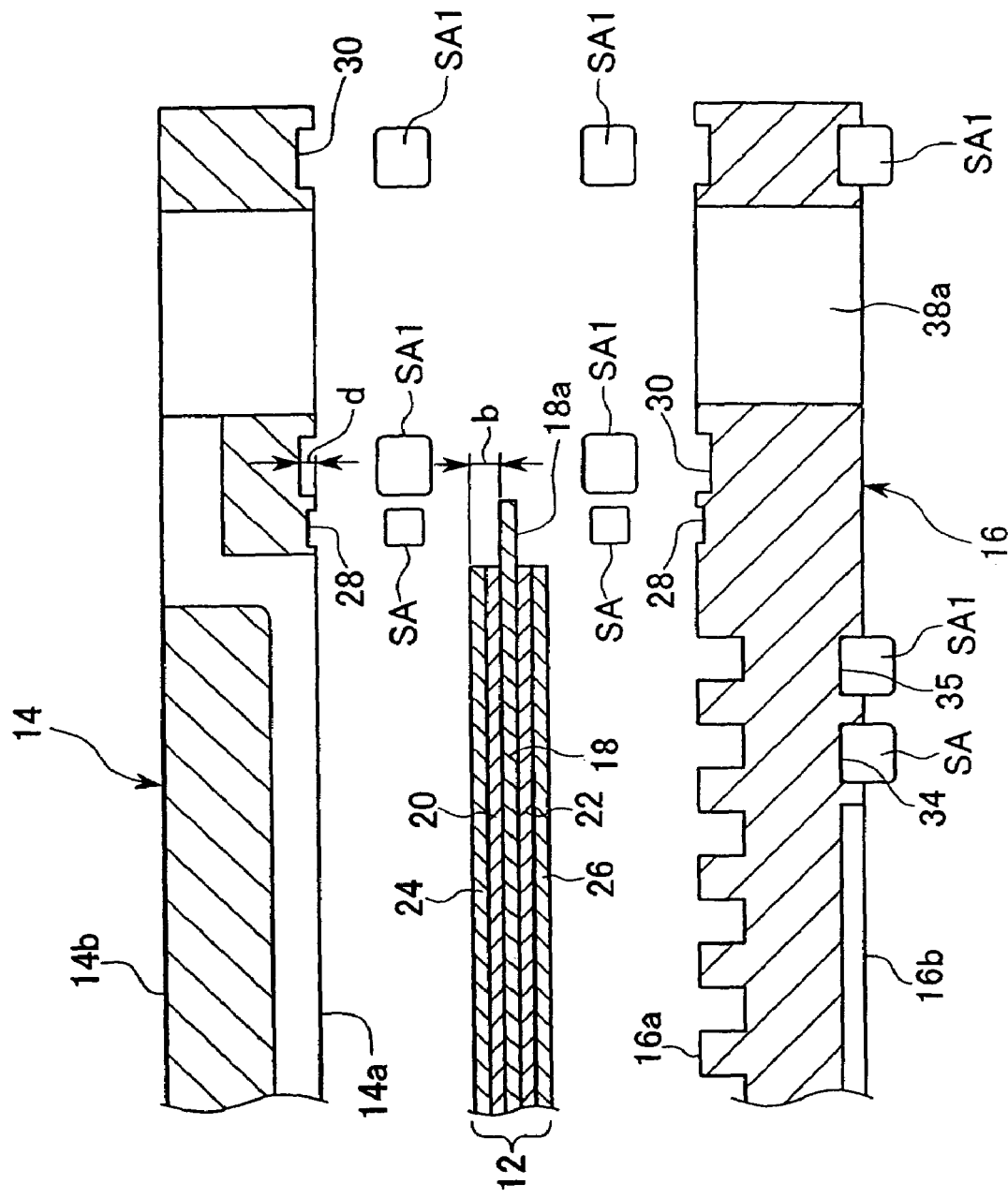
FIG. 28 is an enlarged and exploded view showing the main part of the third embodiment of FIG. 24.

As shown in FIG. 28, a groove 28 is formed on the surface 16a of the second separator 16, which holds the solid polymer electrolyte membrane 18, opposite the anode electrode 22, and corresponds to the projecting portion 18a of the solid polymer electrolyte membrane 18. The liquid sealant SA is applied into the grooves 28. As shown in FIG. 26, grooves 30 enclose the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b which are on the surface 16a of the second separator 16. The liquid sealant SA1 is applied into the grooves 30. The grooves 30 around the inlet side coolant opening 40a and the outlet side coolant opening 40b enclose the first and second coolant connecting passages 76 and 78.

Figure 23:
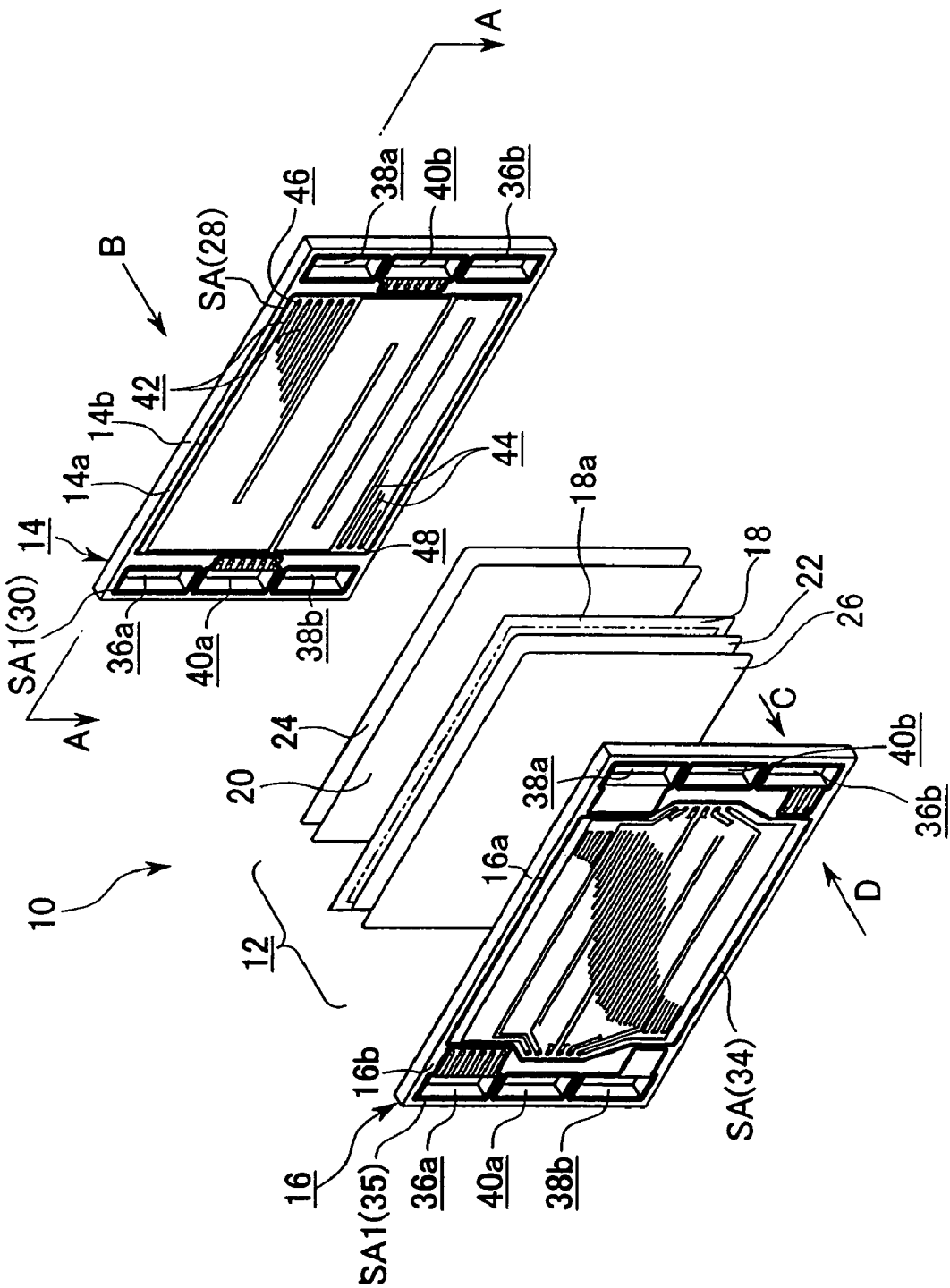
FIG. 23 is an exploded and perspective view showing the third embodiment of the present invention.

As shown in FIG. 23, grooves 28 and 30 are formed on the surface 14a of the first separator 14, which holds the fuel cell subunit 12 with the second separator 16, opposite the cathode electrode 20, and correspond to the grooves 28 and 30 on the second separator 16. The liquid sealant SA is put into the groove 28, and the liquid sealant SA1 is put into the grooves 30.

Figure 24:
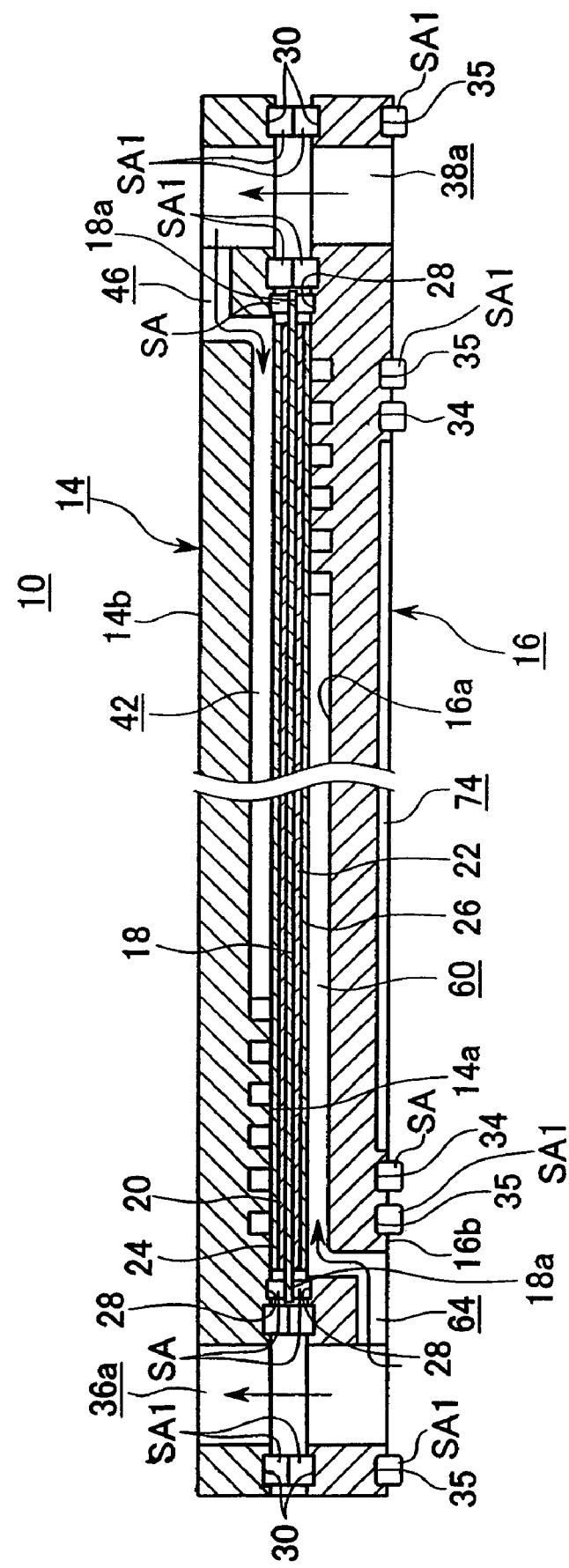
FIG. 24 is a cross-sectional view along the line A-A in FIG. 23.
Figure 25:
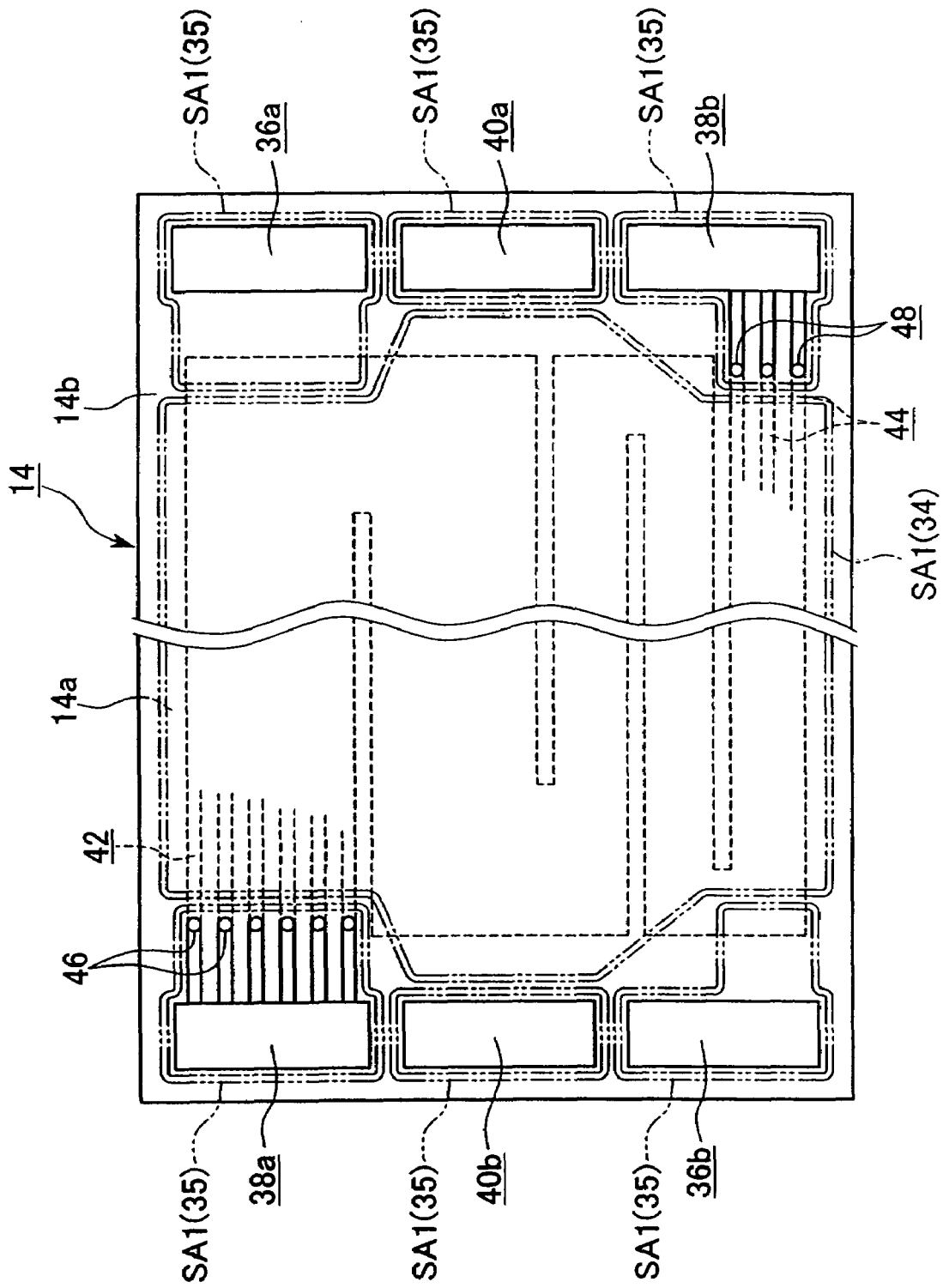
FIG. 25 is a view showing a first separator of the first embodiment from the direction of arrow B in FIG. 23.
Figure 29:
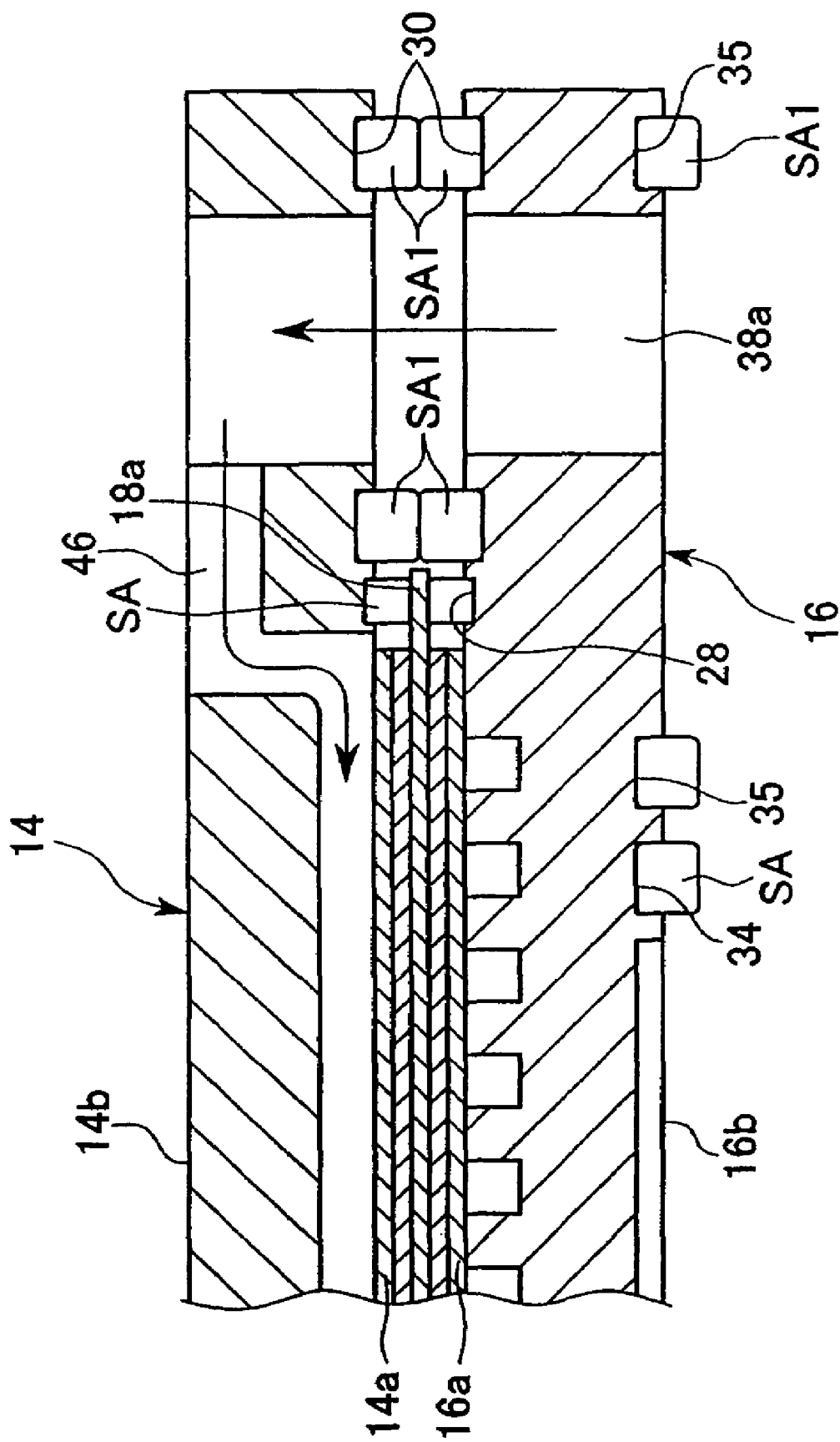
FIG. 29 is an enlarged view showing the main part of the third embodiment of FIG. 24.

As shown in FIGS. 24, 28, and 29, the liquid sealant SA is put into the grooves 28 of the first and second separators 14 and 16 holding the fuel cell subunit 12, and the liquid sealant SA1 is put into the grooves 30. The liquid sealant SA in the grooves 28 holds and makes direct contact with both sides of the projecting portion 18a, thereby sealing the periphery of the fuel cell subunit 12. The liquid sealant SA1 in one groove 30 makes contact with the liquid sealant SA1 in the other groove 30, thereby sealing the periphery of the openings 36a, 36b, 38a, 38b, 40a, and 40b. In FIG. 28, the liquid sealant SA or SA1 is pressed.

Figure 27:
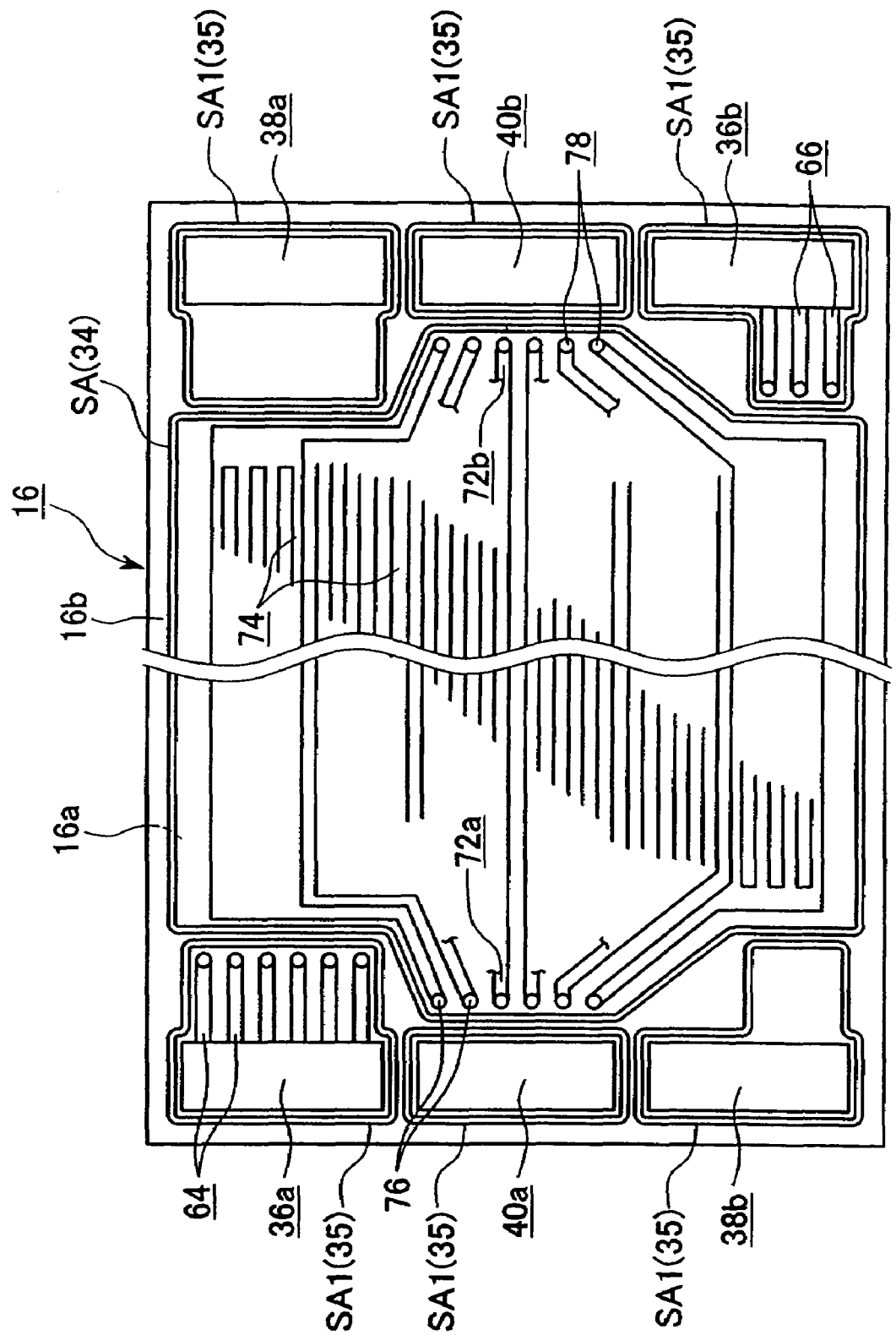
FIG. 27 is a view showing a second separator of the first embodiment from the direction of arrow D in FIG. 23.

As shown in FIG. 27, a groove 34 encloses the branch channels 74 on the surface 16b of the second separator 16, opposite the surface 14b of the first separator 14 when a plurality of fuel cells are stacked. The liquid sealant SA is put into the groove 34. Further, grooves 35 enclose the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b. The liquid sealant SA1 is put into the grooves 35.

The grooves 35 around the inlet side fuel gas opening 36a and the outlet side fuel gas opening 36b enclose the first fuel gas connecting passages 64 and the second fuel gas connecting passages 66. The grooves 35 around the inlet side oxidant gas opening 38a and the outlet side oxidant gas opening 38b enclose the inlet side oxidant gas opening 38a and the outlet side oxidant gas opening 38b on the surface 14b of the first separator 14.

When the fuel cell units 10 are stacked, the surface 14b of the first separator 14 and the surface 16b of the second separator 16 overlap with each other. Then, the liquid sealant SA and the liquid sealant SA1 of the second separator 16 arranged around the inlet side fuel gas opening 36a, the inlet side oxidant gas opening 38a, the inlet side coolant opening 40a, the outlet side coolant opening 40b, the outlet side fuel gas opening 36b, the outlet side oxidant gas opening 38b, and the branch channels 74 make in contact with the surface 14b of the first separator 14, and thereby ensures water-tightness between the first separator 14 and the second separator 16.

The liquid sealant SA and the liquid sealant SA1 are made of a thermosetting fluorine-containing material or thermosetting silicon. The liquid sealant SA and the liquid sealant SA1 have viscosity such that the cross-sectional shape of the sealant does not vary after it has been put into the grooves, and hardens into solid sealant while maintaining a certain degree of elasticity even after the seal has been formed. The sealant may be adhesive, or may not be adhesive. Preferably, the liquid sealant SA and the liquid sealant SA1 disposed between replaceable parts, such as the surface 14b of the first separator 14 and the surface 16b of the second separator 16, are not adhesive. Specifically, the diameters of the applied liquid sealant SA and the liquid sealant SA1 are 0.6 mm, and the load on the sealants is 0.5 to 2 N/mm (when this is below 0.5 N/mm, the sealing performance is degraded, and when it is above 2 N/mm, the seal loses elasticity). The widths of the grooves 28, 30, 34, and 35 are 2 mm, and their depths are 0.2 mm. The liquid sealant SA and the liquid sealant SA1 put into the grooves 28, 30, 34, and 35 are pressed such that their cross-sectional areas are increased, thereby compensating for variation in the sizes of the seal sections, and making regular contact with the seal sections.

In the manufacturing process, the liquid sealant SA is applied into the grooves 28 formed in the peripheries of the first separator 14 and of the second separator 16. This liquid sealant SA which has not yet hardened makes contact with the projecting portion 18a of the solid polymer electrolyte membrane 18. The liquid sealant SA1 is applied into the grooves around the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b. The liquid sealant SA1 in one groove 30 makes contact with the liquid sealant SA1 in the other groove 30 such that the fuel cell subunit 12 is held between the separators 14 and 16, and is then heated with the pressers 82 to harden the liquid sealant SA and the liquid sealant SA1.

By the simple operation of applying the liquid sealant SA1, the peripheries of the openings 36a, 36b, 38a, 38b, 40a, and 40b are sealed while the number of parts and the number of assembling steps are advantageously reduced, simplifying the manufacturing process.

Figure 30:
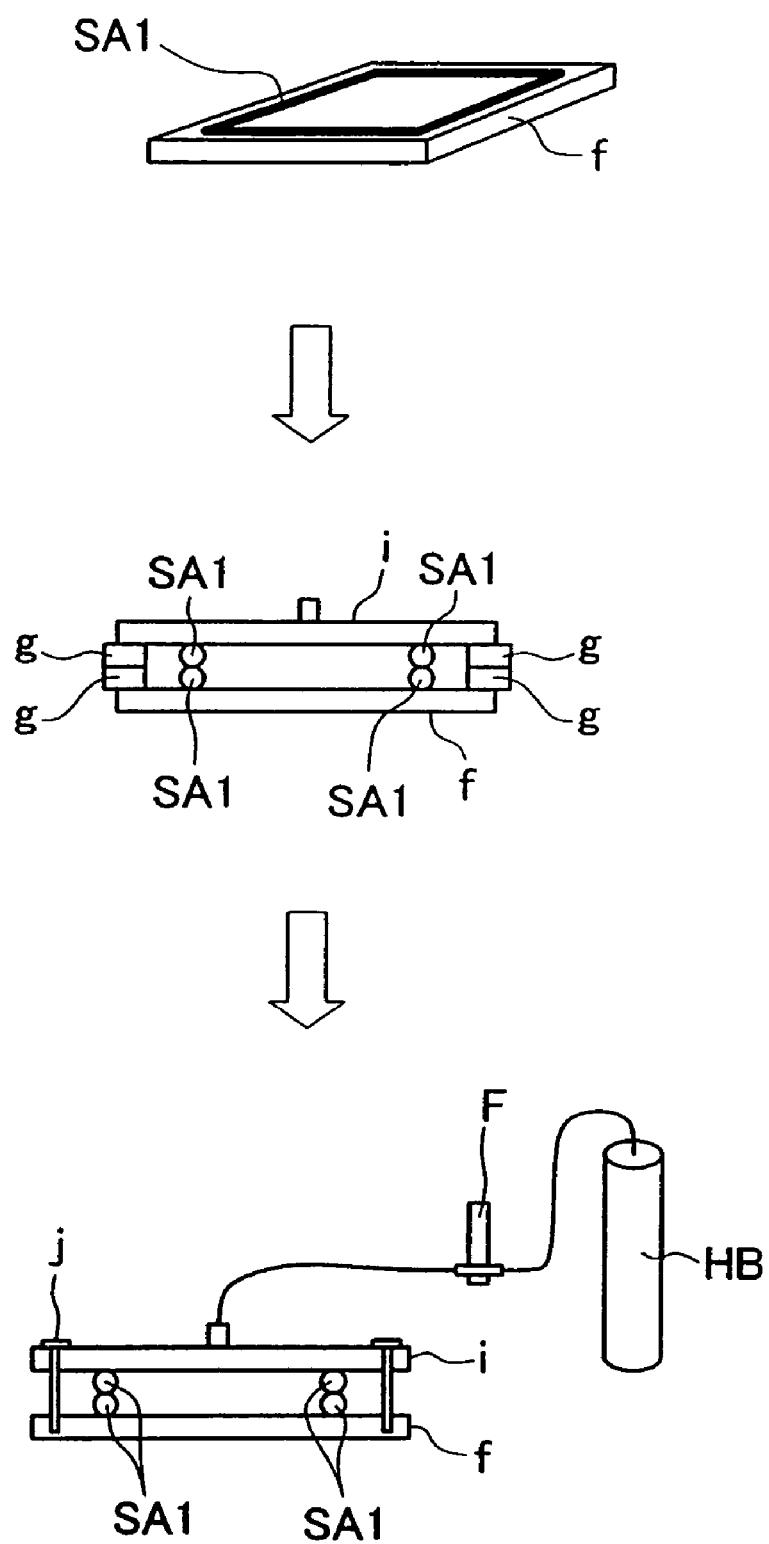
FIG. 30 is a view showing the experiment 1 of the third embodiment.

Experiment 2 was carried out to demonstrate the sealing performance using test pieces for gas sealing. As shown in FIG. 30, in the experiment, the diameter of the liquid sealant SA was 0.6 mm which is the minimum diameter to uniformly apply the liquid sealant SA, the depth of the groove 28 was d, and the width of the cathode electrode 20 and the first diffusion layer 24 was b (which is the same as the width of the anode side). In the experiment, variations of the length of b+d were prepared. Further, the liquid sealant SA1 was a thermosetting fluorine-containing material with the viscosity of 5000 Pa·s.

As shown in FIG. 30, the liquid sealant SA1 of the thermosetting fluorine-containing material with the diameter of 0.6 mm was directly put onto the respective surfaces of a tool which comprises a plate f made of stainless steel (SUS316) and of a plate i made of stainless steel (SUS316) which had an opening for pressurizing a gas. Then, spacers g (films, or steel plates) for adjusting the space (corresponding to b+d) were also inserted. Then, the liquid sealant SA1 was heated for two hours at 150° C. so that it hardened into solid sealant.

Then, the spacers g were removed after the liquid sealant SA1 had hardened. Then, the load of 1 N/mm was given to the sealant, and the test piece was fixed by bolts j while maintaining the load. Then, the test piece was connected to a pipe from a helium gas cylinder HB at a room temperature in the atmosphere, and was pressurized at the gas pressure of 200 kPa. The leakage of the gas was measured by a flowmeter F.

The plate f has the outside dimension of 500×500×5 mm, the length of the applied liquid sealant SA1 was 400×400 mm, and the pressure for applying the sealant was 500 kPa.

The leakages (cc/min) of the gas when the width E of the contact of the liquid sealant SA shown in FIG. 19 was varied by varying the thickness (µm) of the spacer g are shown in the table 2.

TABLE 2

| One Side of Space (Spacer Thickness g) (µm) | Gas Leakage (cc/min) |
| --- | --- |
| 210 | 0 |
| 260 | 0 |
| 310 | 0 |

Figure 31:
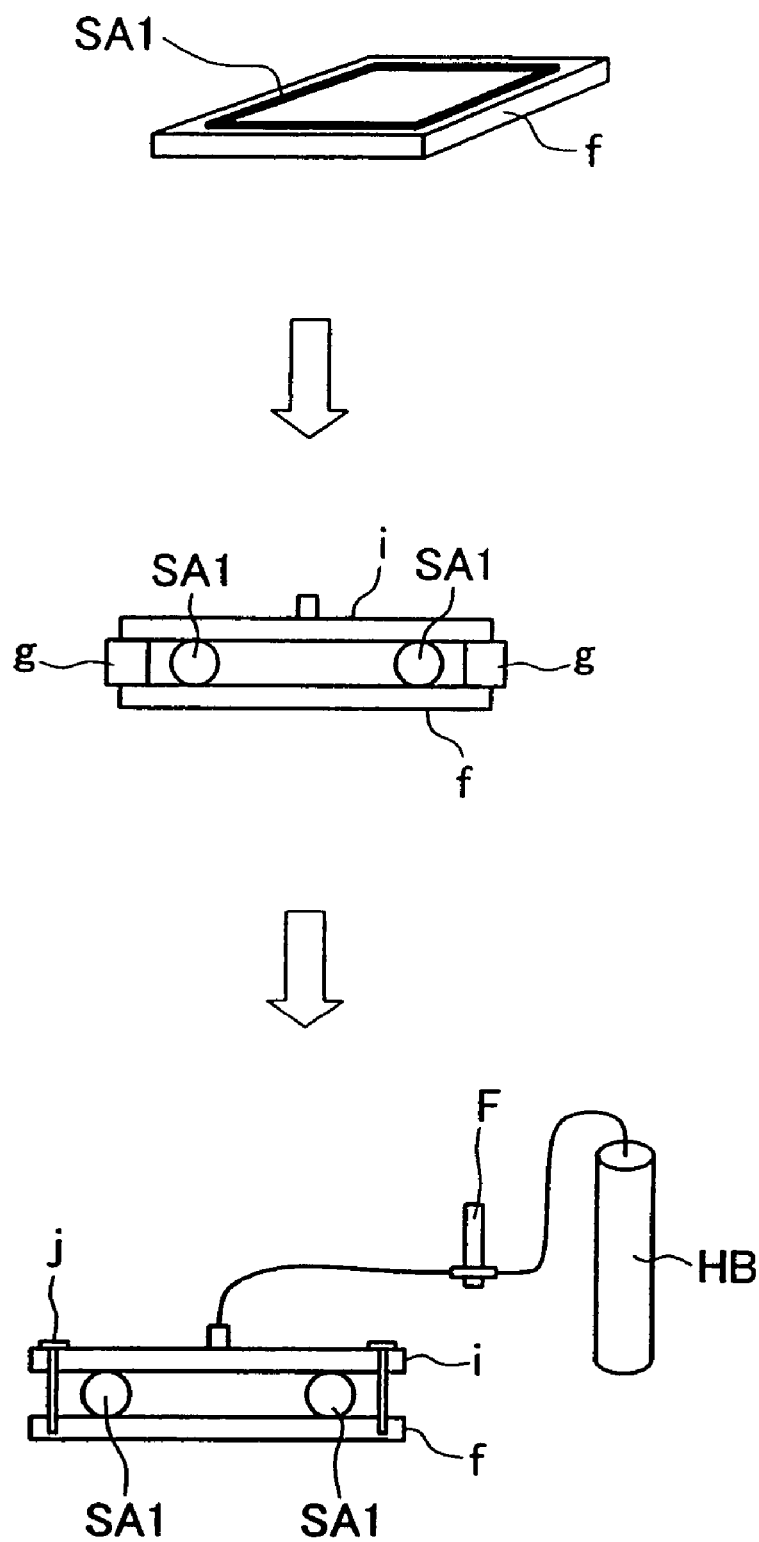
FIG. 31 is a view showing the experiment 2 of the third embodiment.
Figure 32:
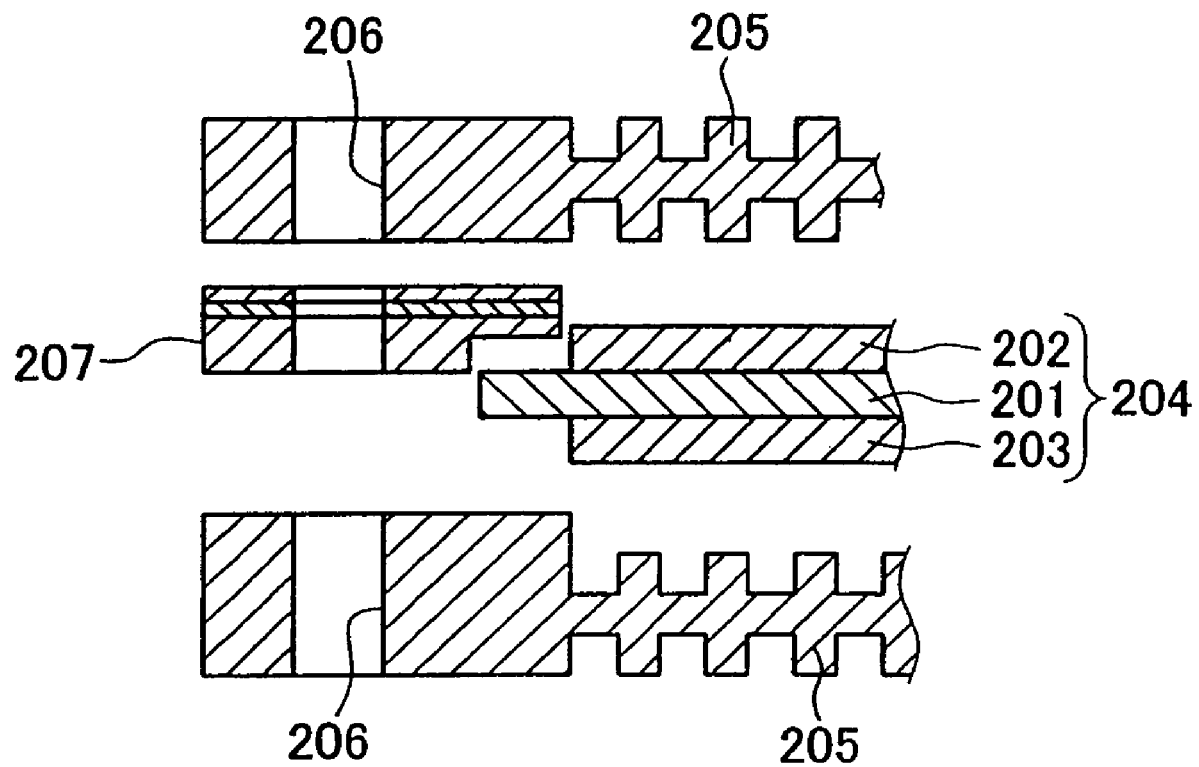
FIG. 32 is a cross-sectional view showing the conventional technique.

According to the experiment 3 shown in FIG. 31, the liquid sealant SA1 with the diameter of 0.9 mm which had the same viscosity and was made from the same materials was directly applied only onto the plate f of stainless steel (SUS316). Then, the spacers g (films, or steel plates) for adjusting the space were inserted between the plate f and the plate i which has the opening for pressurizing the gas. The liquid sealant SA1 made close contact with the plate i. Then, the liquid sealant SA1 was heated for two hours at 150° C. so that it hardened into solid sealant.

Then, the spacers g were removed after the liquid sealant SA1 had hardened. Then, the load of 1 N/mm was given to the sealant, and the test piece was fixed by bolts j while maintaining the load. Then, the test piece was connected to a pipe from a helium gas cylinder HB at a room temperature in the atmosphere, and is pressurized at the gas pressure of 200 kPa. The leakage of the gas was measured by a flowmeter F.

The plate f has outside dimension of 500×500×5 mm, the length of the applied liquid sealant SA1 was 400×400 mm, and the pressure for applying the sealant is 500 kPa.

Leakages of the gas when the width E of the contact of the liquid sealant SA shown in FIG. 19 was varied by varying the thickness (µm) of the spacer g are shown in Table 3.

TABLE 3

| Space (Spacer Thickness g) (μm) | Gas Leakage (cc/min) |
| --- | --- |
| 420 | 0 |
| 520 | 0 |
| 620 | 0 |

The gas leakage is zero when in Experiment 1 the liquid sealant SA1 was applied onto the respective plates f and i, while the gas leakage is zero when in Experiment 2 the liquid sealant SA1 was applied onto one of the plates f and makes contact wit the other plate i. That is, the sealing by the liquid sealant SA1 in one groove and the liquid sealant SA1 in the other groove in the peripheries of the openings 36a, 36b, 38a, 38b, 40a, and 40b between the face 14a of the first separator 14 and the face 16a of the second separator 16 is reliable, while the sealing by the sealant SA1 only in one groove in the peripheries of the openings 36a, 36b, 38a, 38b, 40a, and 40b between the face 14b of the first separator 14 and the face 16b of the second separator 16 is also reliable.

According to the above embodiment, the liquid sealant SA1 in one grooves 30 makes contact with the liquid sealant SA1 in the other grooves 30 in the peripheries of the inlet side fuel gas opening 36a, the inlet side oxidant gas opening 38a, the inlet side coolant opening 40a, the outlet side coolant opening 40b, the outlet side fuel gas opening 36b, and the outlet side oxidant gas opening 38b. The sealant SA1 is pressed between the first and second separators 14 and 16, fitting the varying sizes of the seal sections, and maintains gas-tightness between the separators while maintaining even pressure on the grooves 28, 30, 34, and 35. Therefore, the reaction force produced by the seal is uniform throughout the peripheries of the openings 36a, 36b, 38a, 38b, 40a, and 40b, thereby making the seal uniform.

Particularly, the fit of the liquid sealant SA1 to the varying sizes of the seal sections is satisfactory. Therefore, the manufacturing thicknesses of the first separator 14, and the second separator 16 need not be accurately controlled. Management of the accuracy in size is easy, and manufacturing costs can be reduced.

Further, the liquid sealant SA1 put into the grooves 30 of the first separator 14 and the second separator 16 maintains a regular width within the grooves 30, while the liquid sealant SA1 in one groove makes contact with the liquid sealant SA1 in the other grooves, and is pressed according to the sizes of the seal sections. Thus, gas-tightness around the openings 36a, 36b, 38a, 38b, 40a, and 40b can be achieved simply by holding the fuel cell subunit 12 between the first separator 14 and the second separator 16.

The liquid sealant SA compensates for the variation in the sizes of the seal sections between the first and second separators 14 and 16, and therefore prevents the partial forces from acting on the separators 14 and 16. Therefore, the separators 14 and 16 can be thin, the fuel cell can be light, and the size of the fuel cell can be reduced. The fuel cell of the present invention is suitable for a vehicle in which the space for the fuel cell is limited, and in which it is desirable for the separators 14 and 16 to be as thin as possible.

Further, the present invention employs a structure provided simply by contacting the liquid sealant SA1 in one groove with the liquid sealant SA1 in the other grooves, thereby reducing the number of parts and the number of assembling steps, as compared with the technique using the gaskets which are assembled from a number of parts.

According to the above embodiment, the liquid sealant SA also contributes the sealing in a manner similar to the liquid sealant SA1. The liquid sealant SA is directly in contact with the projecting portion 18a provided at the periphery of the solid polymer electrolyte membrane 18, is pressed between the solid polymer electrolyte membrane 18 and the first and second separators 14 and 16, fitting the varying sizes of the seal sections, and maintains gas-tightness between the solid polymer electrolyte membrane 18 and the first and second separators 14 and 16 while maintaining even pressure on the grooves 28, 30, 34, and 35. Therefore, the reaction force produced by the seal is uniform throughout the periphery between the first and second separators 14 and 16 and the fuel cell subunit 12, thereby making the seal uniform.

The third embodiment achieves the same effects as those of the first and second embodiments.

Fourth Embodiment

Next, the fourth embodiment of the present invention will now be explained with reference to the drawings. The structure of the fuel cell of the fourth embodiment is similar to that of the first and second embodiment, and therefore the differences will be mainly discussed.

Figure 33:
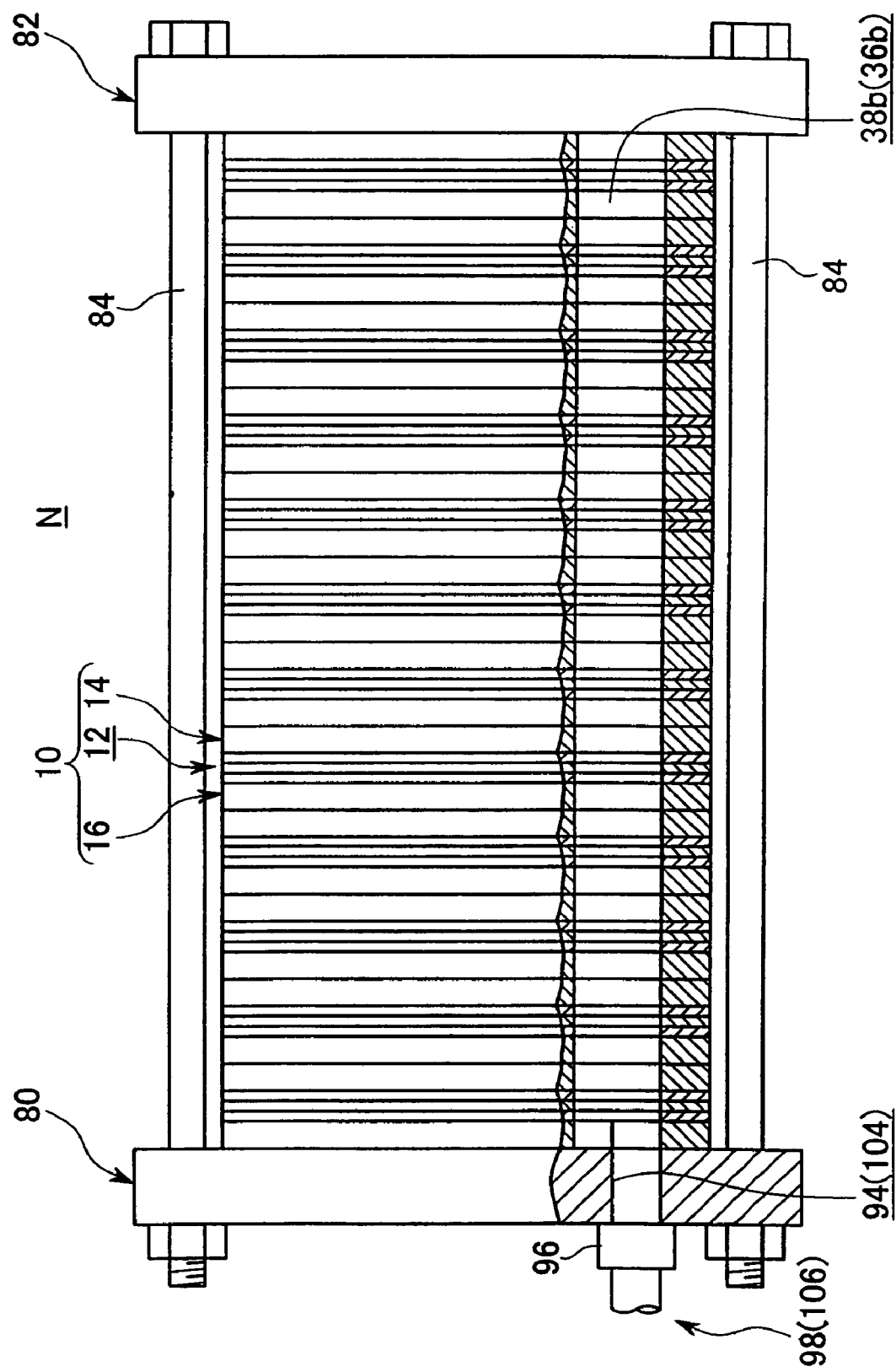
FIG. 33 is an assembly diagram showing the fourth embodiment of the present invention.

FIG. 33 shows a fuel cell stack N of the fourth embodiment. The fuel cell stack N includes a stack of fuel cell units 10. Each fuel cell unit 10 comprises fuel cell (membrane electrode assembly) 12, and the first and second separators 14 and 16 for holding the fuel cell therebetween. First and second end plates 80 and 82 are disposed at both ends of the fuel cell units 10 of the fuel cell stack N, and are tightened and fixed by tie rods 84.

The first end plate 80 has an opening 94 which communicates with the outlet side oxidant gas opening 38b. A manifold pipe 98 is connected to the first end plate 80, and communicates with the opening 94 via a joint 96. The first end plate 80 has an opening 104 which communicates with the outlet side fuel gas opening 36b. The opening 104 is connected to a manifold pipe 106 which has the similar structure to the manifold pipe 106.

Although, in the fourth embodiment, the first separator 14, and the second separator 16 have a structure similar to those of the third embodiment, the liquid sealant SB is adhesive sealant, and liquid sealant SB1 is non-adhesive sealant.

Figure 34:
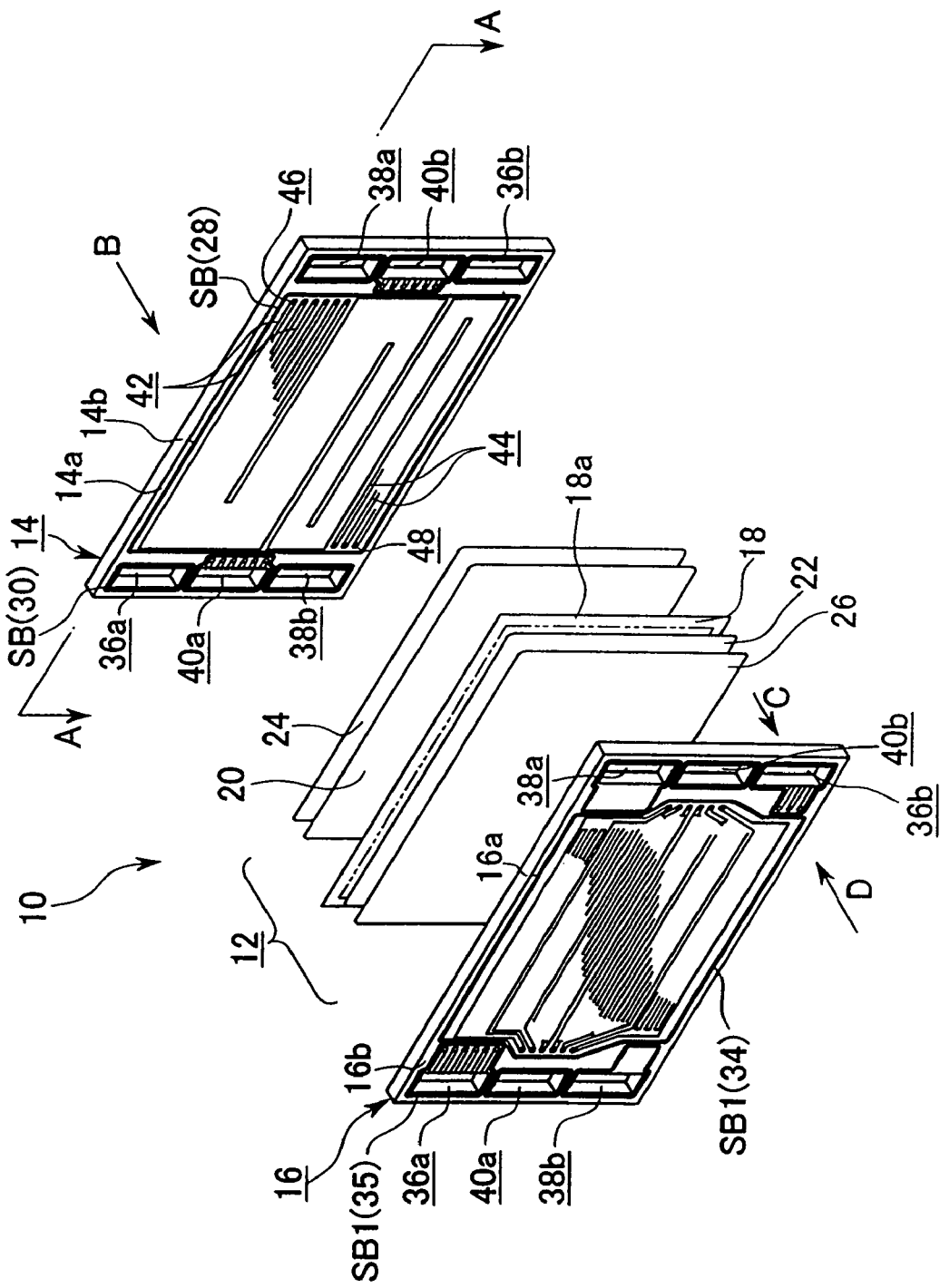
FIG. 34 is an exploded and perspective view showing the fourth embodiment.
Figure 37:
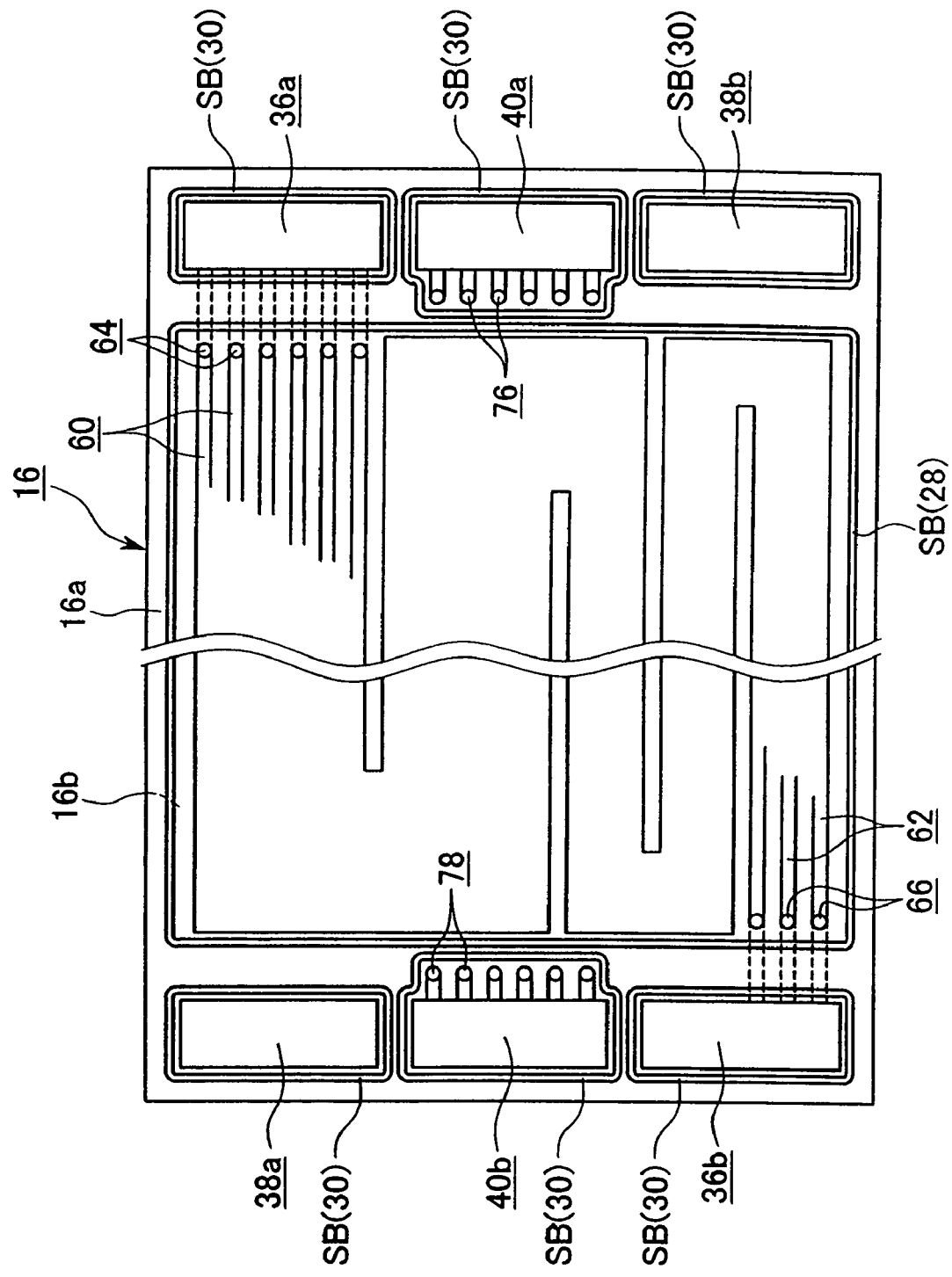
FIG. 37 is a view showing a second separator of the fourth embodiment from the direction of arrow C in FIG. 34.

That is, as shown in FIG. 37, the adhesive liquid sealant SB is applied into the grooves 28 in the surface 16a of the second separator 16. The adhesive liquid sealant SB is applied also into the grooves 30 in the surface 16a of the second separator 16. The liquid sealant SB in the grooves 30 may be non-adhesive because the adhesive liquid sealant in the groove 28 combines the first separator 14 with the second separator 16. The adhesive liquid sealant SB is applied into the grooves 28 and 30 in the face 14a of the first separator 14. As shown in FIG. 34, the adhesive liquid sealant SB is applied into the grooves 28 and 30 in the surface 14a of the first separator 14

Figure 35:
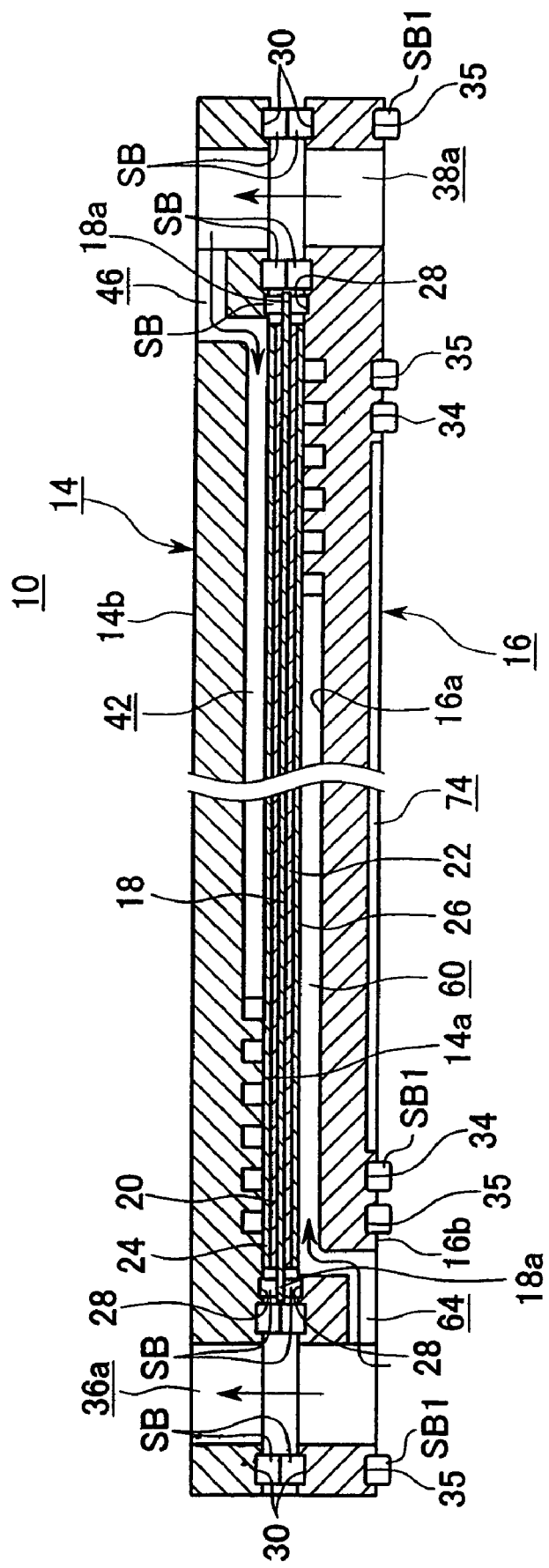
FIG. 35 is a cross-sectional view along the line A-A in FIG. 34.
Figure 36:
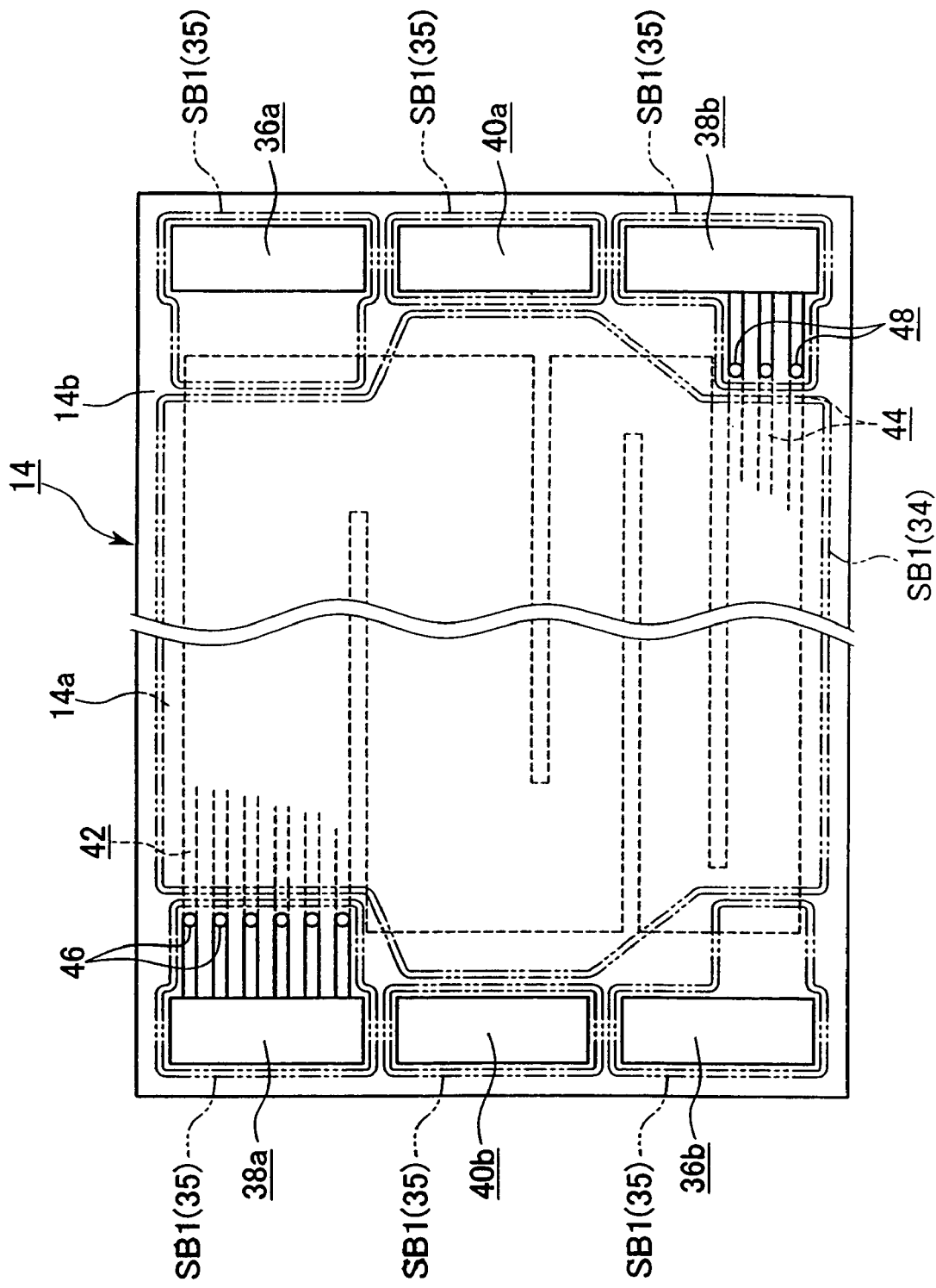
FIG. 36 is a view showing a first separator of the fourth embodiment from the direction of arrow B in FIG. 34.
Figure 39:
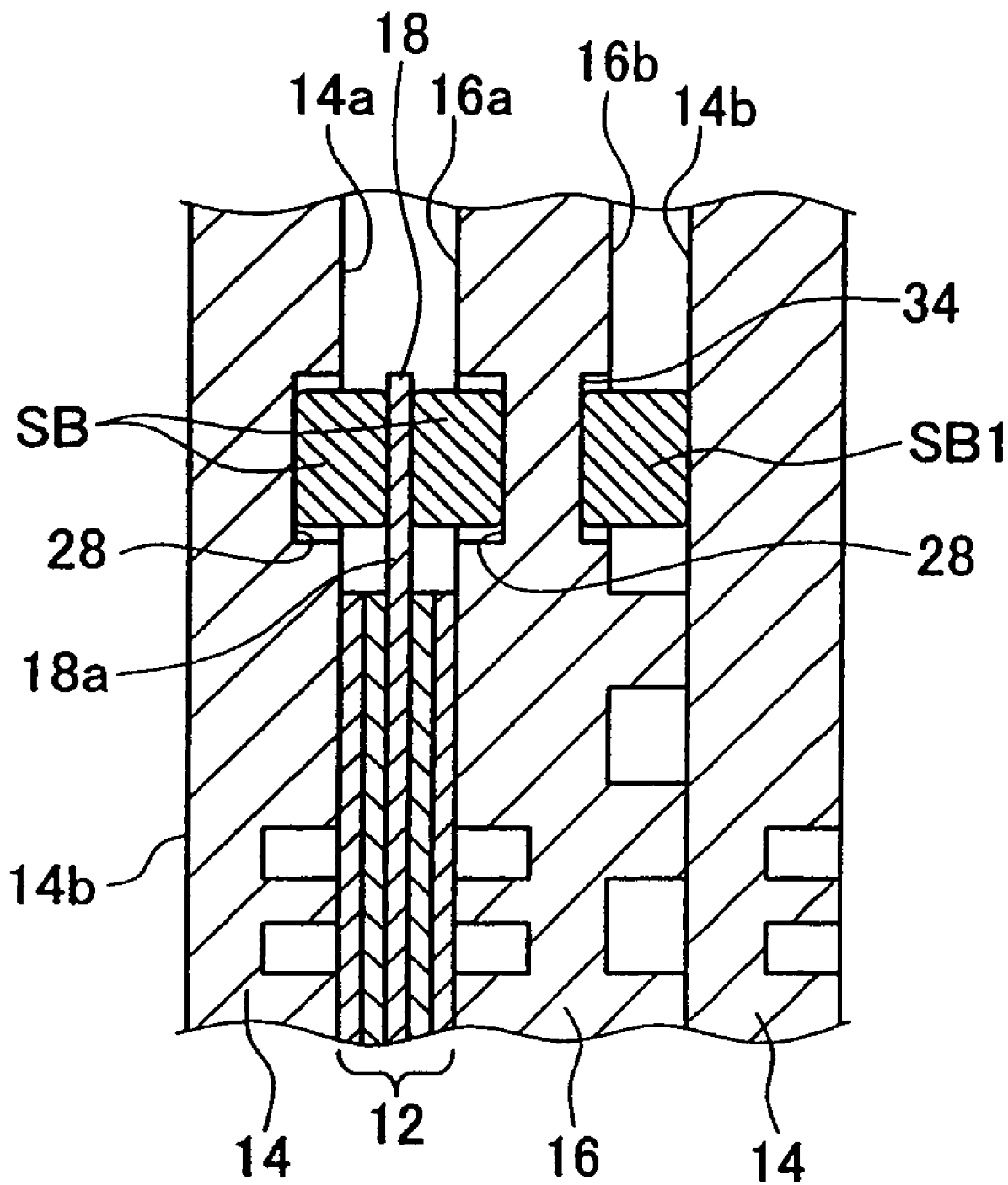
FIG. 39 is an enlarged view showing the main part of FIG. 34.

As shown in FIGS. 35, 36, and 39, the liquid sealant SB is put into the grooves 28 and 30 of the first and second separators 14 and 16 holding the fuel cell unit 12. The liquid sealant SB in the grooves 28 holds and makes direct contact with both sides of the projecting portion 18a, thereby sealing the periphery of the fuel cell unit 12. The liquid sealant SB in one groove 30 makes contact with the liquid sealant SB in the other groove 30, thereby sealing the periphery of the openings 36a, 36b, 38a, 38b, 40a, and 40b.

Figure 38:
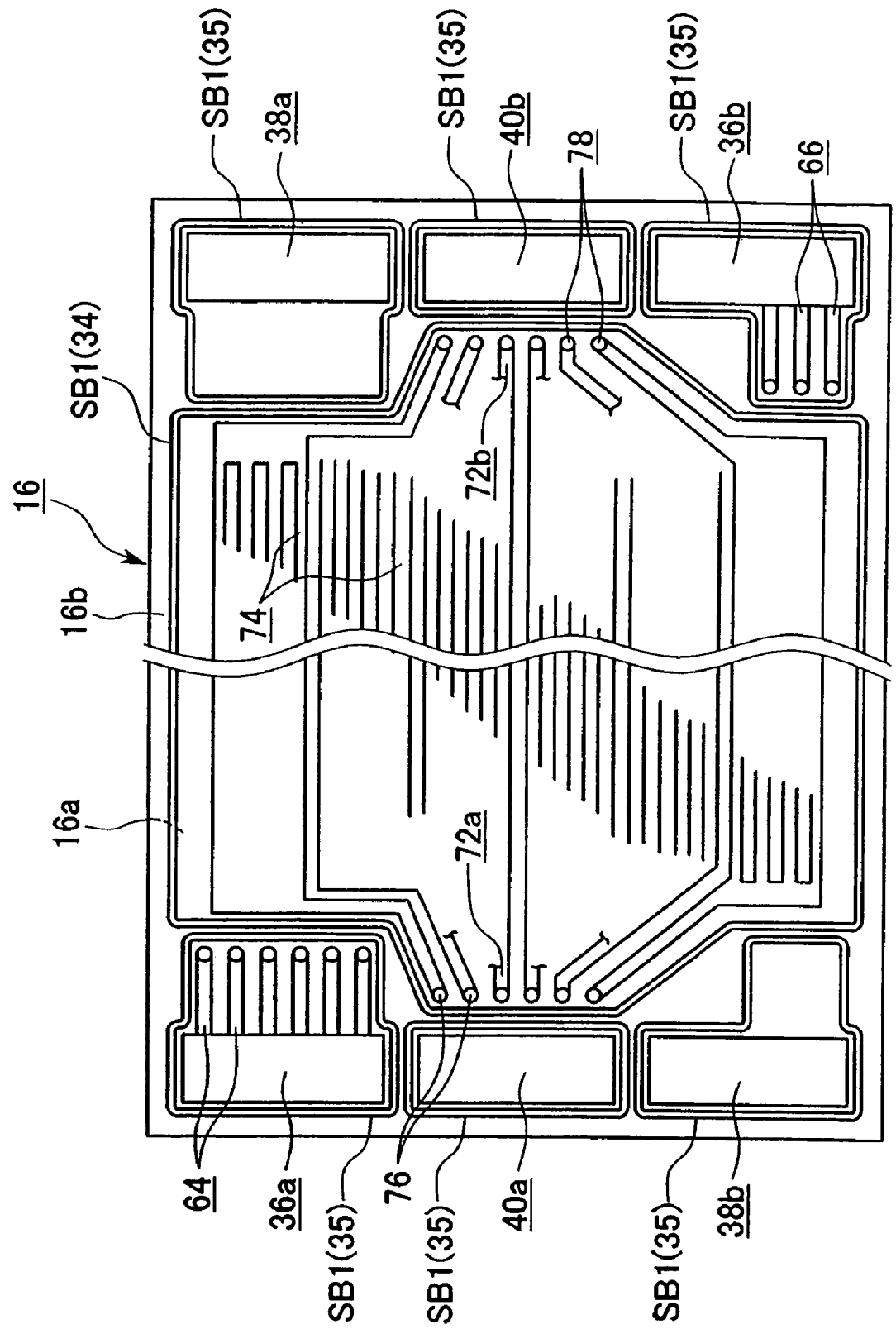
FIG. 38 is a view showing a second separator of the fourth embodiment from the direction of arrow D in FIG. 34.

As shown in FIG. 38, the non-adhesive liquid sealant SB1 is put into the groove 34 in the surface 16b of the second separator 16. Further, the non-adhesive liquid sealant SB1 is put into the grooves 35 in the surface 16b of the second separator 16.

The liquid sealant S or SB is made of a thermosetting fluorine-containing material or thermosetting silicon. The liquid sealant S has viscosity such that the cross-sectional shape of the sealant does not vary after it has been put into the grooves, and hardens into solid sealant while maintaining a certain degree of elasticity even after the seal has been formed. The adhesive liquid sealant SB is a thermosetting fluorine-containing sealant with a hydroxyl group which contributes the adhesion.

The examples of steps for stacking the first and second separators 14 and 16 will be explained. In the followings, only the liquid sealant SB and SB1 applied into the grooves 28 and 34 is discussed, while the explanations of the liquid sealant SB put into the grooves 30 and the liquid sealant SB1 put into the grooves 35 are omitted.

The round cross-sectional shape of the liquid sealant SB or SB1 indicates the condition of the liquid sealant which has been applied. The square or hexagonal cross-sectional shape of the liquid sealant SB or SB1 indicates the condition of the liquid sealant which has been pressed and has hardened. In the following explanations, the non-adhesive sealant includes low adhesive sealant which is described later.

Figure 40:
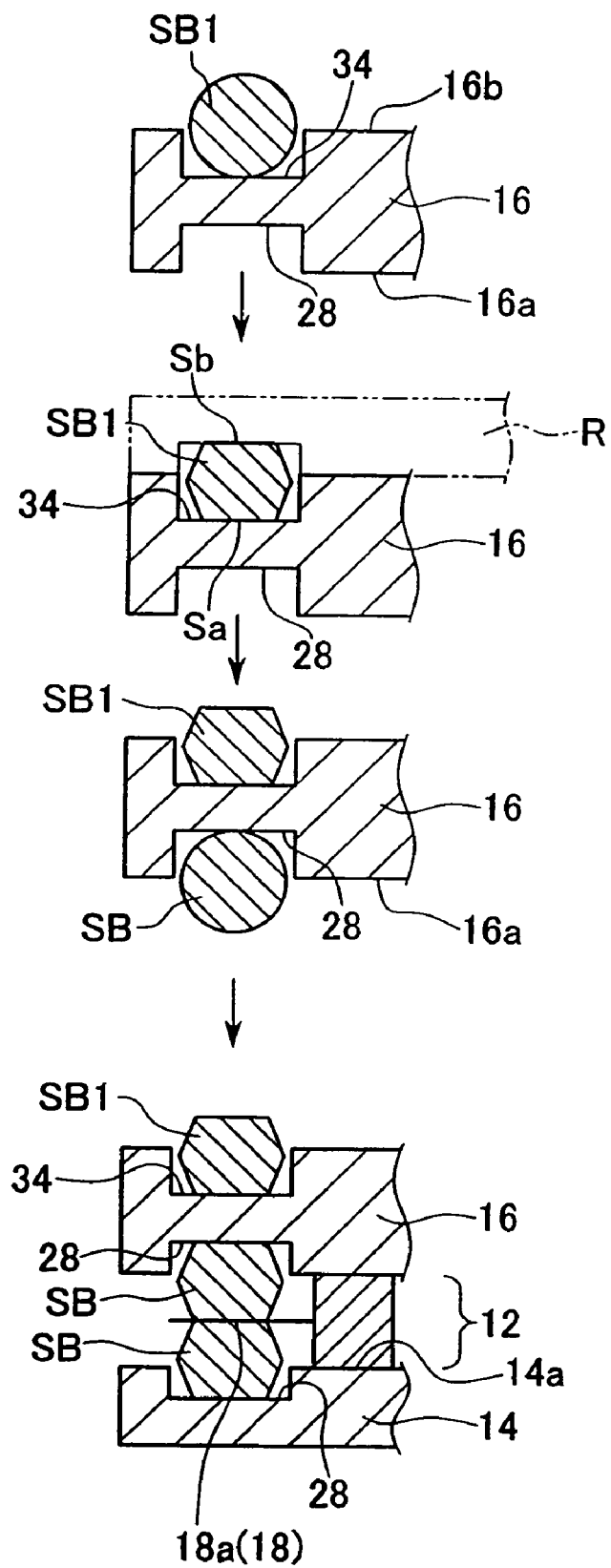
FIG. 40 is a view showing the first example of stacking the parts of the fourth embodiment.

In the first example shown in FIG. 40, the liquid sealant SB1 is put into the groove 34 in the surface 16b of the second separator 16. The liquid sealant SB1 is adhesive. A mold R (indicated by the dotted lines) coated with Teflon presses, heats, and hardens the liquid sealant S1 put into the groove 34. One side (Sa) of the adhesive liquid sealant which has hardened adheres to the groove 34, and the shear adhesive force of the other side (Sb) is decreased, that is, becomes non-adhesive. The distinction between the non-adhesive sealant and the adhesive sealant is determined by the shear adhesion, and is not determined by the type of the adhesive.

Then, the liquid sealant SB is applied into the groove 28 of the second separator 16, and the fuel cell subunit 12 is held between that liquid sealant SB and the liquid sealant SB in the other groove 28 of the first separator 14. While the liquid sealant SB thus supports the solid polymer electrolyte membrane 18, the liquid sealant SB is heated so that it hardens into a solid seal, at which point the assembling of the fuel cell unit 10 is completed.

This example is expressed as the method for manufacturing the fuel cell stack N as follows.

The solid polymer electrolyte membrane 18 is held by the anode side diffusion electrode (which comprises the anode electrode 22 and the second diffusion layer 26) and the cathode side diffusion electrode (which comprises the cathode electrode 20 and the second diffusion layer 24), thereby to produce the membrane electrode assembly (which corresponds to the fuel cell subunit 12). Then, the membrane electrode assembly is held by a pair of separators 14 and 16 to produce the fuel cell unit 10. Then, a number of the fuel cell units 10 are stacked to produce the fuel cell stack N. In this manufacturing process, the adhesive liquid sealant SB1 is applied onto a predetermined section (groove 34) of one of the surfaces 16b of the separator. Then, the mold R presses, heats, and hardens the adhesive liquid sealant into the non-adhesive solid sealant. Then, the adhesive liquid sealant SB is applied onto a predetermined section (groove 28) of the other surface 16a of the separator. Then, the membrane electrode assembly is held between that adhesive sealant SB and the adhesive liquid sealant applied onto a predetermined section (groove 28) of the surface 14a of the other separator. Then, the liquid sealant is heated, and hardens. Then, the fuel cell units 10 are stacked.

According to this structure, the separator of one fuel cell unit can be easily separated from the separator of the other fuel cell unit. Therefore, the fuel cell can be easily disassembled and reassembled.

That is, in the fuel cell stack N which includes the stacked units, the sealant SB1 of the first separator 14 which has been pressed and solidified by the mold R can be easily separated. Therefore, when replacing one of the solid polymer electrolyte membranes 18, the first separators 14, and the second separators 16, the fuel cell unit 10, each of the fuel cell units 10 can be easily disassembled and reassembled. Thus, the rebuildability is improved. Because the adhesive sealant SB binds the first separator 14 and the second separator 16 holding the fuel cell subunit 12, these parts are prevented from accidentally being separated when disassembling or reassembling the fuel cell stack.

Further, the sealant SB1 adheres to the grooves 34 of the second separator 16, the sealant SB1 is prevented from accidentally falling when assembling the fuel cell stack.

The second example of the present invention will be explained with reference to FIG. 41. The non-adhesive liquid sealant SB1 is applied into the groove 34 in the surface 16b of the separator 16. Then, the surface 14b of the first separator 14 is placed onto the liquid sealant SB1 on the surface 16b of the second separator 16, and then the liquid sealant SB1 hardens. Then, the adhesive liquid sealant SB is applied into the groove 28 in the surface 16a of the second separator 16. While the fuel cell subunit 12 is held between the first separator 14 and the second separator 16, the liquid sealant SB in the grooves 28 is heated to harden. Thus, the fuel cell unit 10 is assembled.

This example is expressed as the method for manufacturing the fuel cell stack N as follows.

The solid polymer electrolyte membrane 18 is held by the anode side diffusion electrode (which comprises the anode electrode 22 and the second diffusion layer 26) and the cathode side diffusion electrode (which comprises the cathode electrode 20 and the second diffusion layer 24), thereby to produce the membrane electrode assembly (which corresponds to the fuel cell subunit 12). Then, the membrane electrode assembly is held by a pair of separators 14 and 16 to produce the fuel cell unit 10. Then, a number of the fuel cell units 10 are stacked to produce the fuel cell stack N. In this manufacturing process, the non-adhesive liquid sealant SB1 is applied onto a predetermined section (groove 34) of one of the surfaces 16b of the separator. Then, another separator is placed on liquid sealant SB1, and the liquid sealant SB1 hardens. Then, the adhesive liquid sealant SB is applied onto a predetermined section (groove 28) in the surface 16a opposite the membrane electrode assembly. Then, the adhesive liquid sealant SB is applied onto a predetermined section (groove 28) in the surface 14a opposite the membrane electrode assembly. While the fuel cell subunit 12 is held between the liquid sealant SB in one groove and the liquid sealant SB in the other groove, the liquid sealant SB is heated to harden. Thus, the fuel cell units 10 are stacked.

According to this structure, the separator of one fuel cell unit can be easily separated from the separator of the other fuel cell unit. Therefore, the fuel cell can be easily disassembled and reassembled.

Because, in the fuel cell stack N manufactured by stacking the units, the non-adhesive sealant SB1 seals the space between the first separator 14 and the second separator 16, the separators can be disassembled and reassembled. Because the adhesive sealant SB binds the first separator 14 and the second separator 16 holding the fuel cell subunit 12, these parts are prevented from accidentally being separated when disassembling or reassembling the fuel cell stack.

Figure 42:
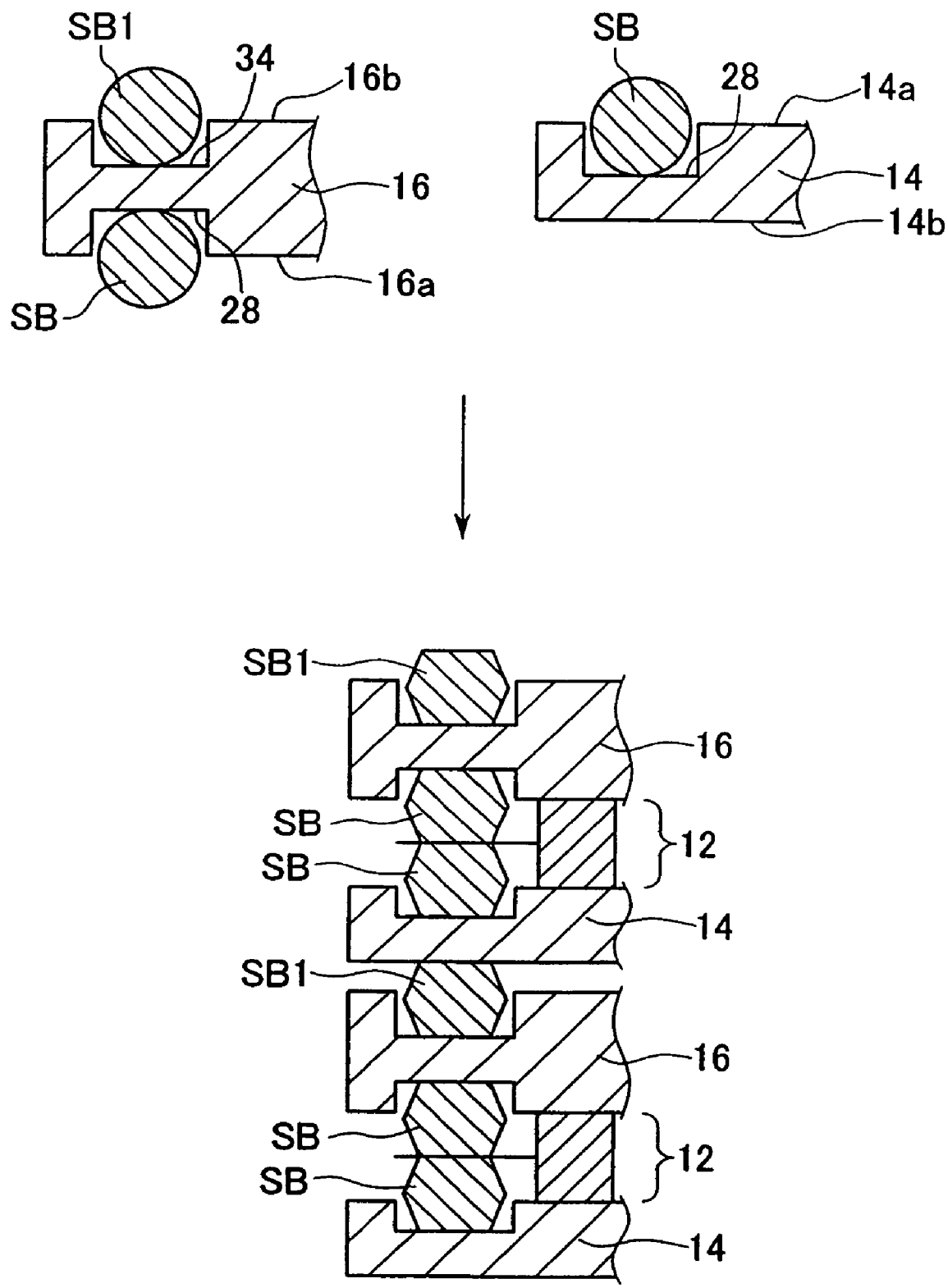
FIG. 42 is a view showing the third example of stacking the parts of the fourth embodiment.

The third example of the present invention will be explained with reference to FIG. 42. The adhesive liquid sealant SB is applied into the groove 28 of the first separator 14, and the adhesive liquid sealant SB is applied into the groove 28 in the surface 16a of the second separator 16. Then, the fuel cell subunit 12 is held by the first separator 14 and the second separator 16, and a number of subunits 12 are stacked and heated so that the liquid sealant hardens into solid seals.

This example is expressed as the method for manufacturing the fuel cell stack N as follows.

The solid polymer electrolyte membrane 18 is held by the anode side diffusion electrode (which comprises the anode electrode 22 and the second diffusion layer 26) and the cathode side diffusion electrode (which comprises the cathode electrode 20 and the second diffusion layer 24), thereby to produce the membrane electrode assembly (which corresponds to the fuel cell subunit 12). Then, the membrane electrode assembly is held by a pair of separators 14 and 16 to produce the fuel cell unit 10. Then, a number of the fuel cell units 10 are stacked to produce the fuel cell stack N. In this manufacturing process, the adhesive liquid sealant SB is applied into a predetermined section (groove 28) in one of the surfaces 14a of the separator opposite the membrane electrode assembly. The non-adhesive liquid sealant SB1 is applied in a predetermine section (groove 34) in the other surface of the separator. The adhesive liquid sealant SB is put in a predetermined section (groove 28) in the surface 16a of another separator opposite the membrane electrode assembly. Then, the membrane electrode assembly is held by the separators, and a number of units are stacked and are heated to harden.

According to this structure, the separator of one fuel cell unit can be easily separated from the separator of the other fuel cell unit. Therefore, the fuel cell can be easily disassembled and reassembled. Further, the process is not divided into two steps as described in the first and second examples, and the adhesive liquid sealant and the non-adhesive liquid sealant harden at the same time, thereby reducing the number of steps, and improving the productivity.

Because, in the fuel cell stack N manufactured by stacking the units, the non-adhesive sealant SB1 seals the space between the first separator 14 and the second separator 16, the separators can be disassembled and reassembled. Because the adhesive sealant SB binds the first separator 14 and the second separator 16 holding the fuel cell subunit 12, these parts are prevented from accidentally being separated when disassembling or reassembling the fuel cell stack, in a manner similar to the first and second examples.

Figure 43:
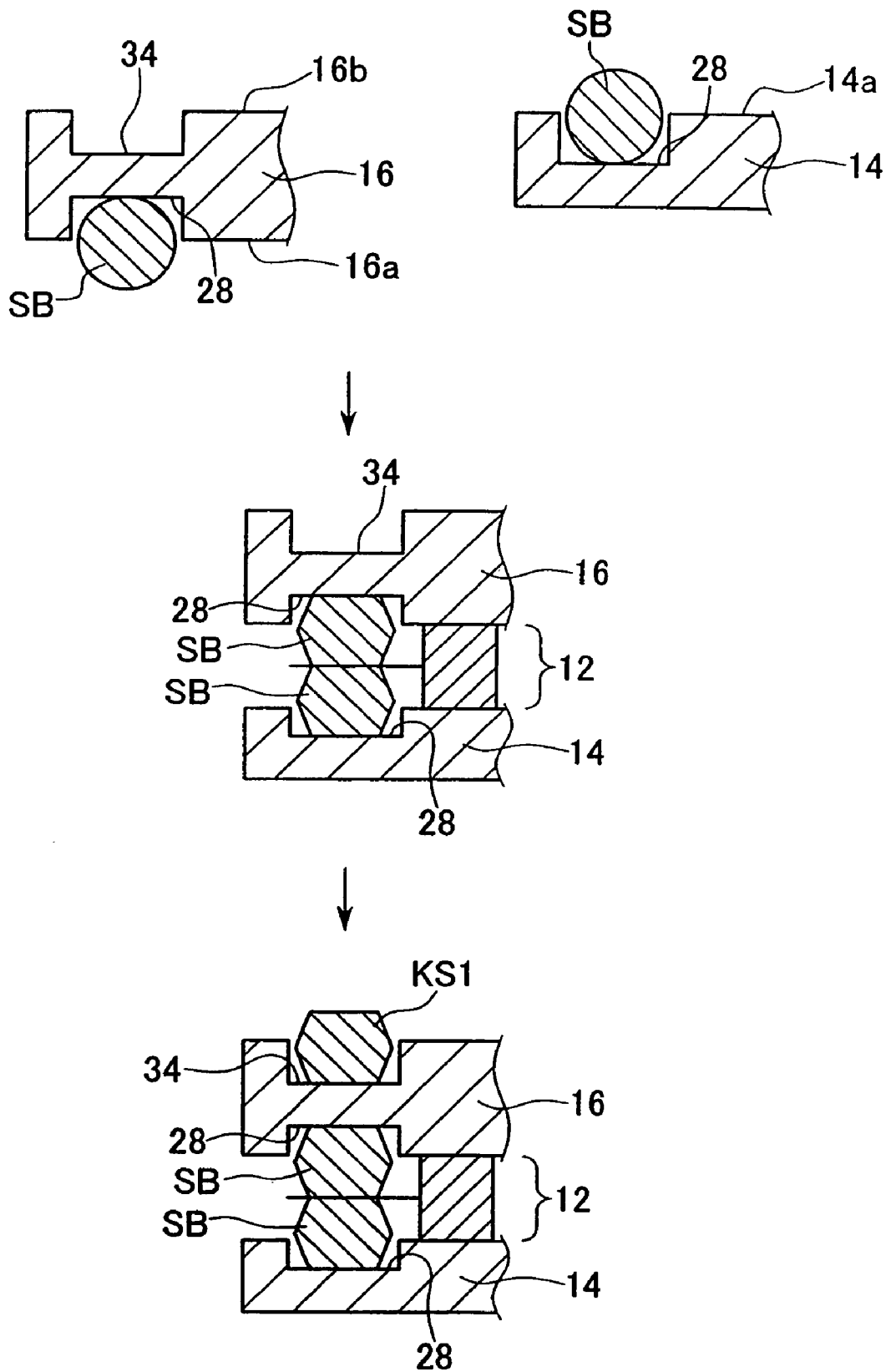
FIG. 43 is a view showing the fourth example of stacking the parts of the fourth embodiment.

The fourth example will be explained with reference to FIG. 43. The liquid sealant SB is applied into the groove 28 in the surface 16a of the second separator 16. The adhesive liquid sealant SB is applied in the groove 28 of the first separator 14. Then, the fuel cell subunit 12 is held by the second separator 16 and the first separator 14, and the liquid sealant SB is heated to harden. Thus, the fuel cell unit 10 is assembled. Then, non-adhesive solid sealant KS1 is installed in the groove 34 in the surface 16b of the second separator 16. The solid sealant KS1 may adhere to the groove 34.

This example is expressed as the method for manufacturing the fuel cell stack N as follows.

The solid polymer electrolyte membrane 18 is held by the anode side diffusion electrode (which comprises the anode electrode 22 and the second diffusion layer 26) and the cathode side diffusion electrode (which comprises the cathode electrode 20 and the second diffusion layer 24), thereby to produce the membrane electrode assembly (which corresponds to the fuel cell subunit 12). Then, the membrane electrode assembly is held by a pair of separators 14 and 16 to produce the fuel cell unit 10. Then, a number of the fuel cell units 10 are stacked to produce the fuel cell stack N. In this manufacturing process, the adhesive liquid sealant SB is applied into a predetermined section (groove 28) in one of the surfaces 14a of the separator opposite the membrane electrode assembly. The adhesive liquid sealant SB is applied in a predetermined section (groove 28) in the surface 16a of another separator opposite the membrane electrode assembly. Then, the membrane electrode assembly is held by the separators, and the liquid sealant SB is heated to harden. Then, the non-adhesive solid sealant KS1 is installed in a predetermine section (groove 34) in the other surface 16b of the separator. Then, a number of units are stacked.

According to this structure, the separator of one fuel cell unit can be easily separated from the separator of the other fuel cell unit. Therefore, the fuel cell can be easily disassembled and reassembled. Further, because the solid sealant has been formed at the time of installation, the solid sealant is simply set in the predetermined section, thereby eliminating the step of applying the liquid sealant, and improving the productivity.

That is, in the fuel cell stack N which includes the stacked units, the sealant KS1 can be easily separated. The replacement one of fuel cell units 10 is easy, and the rebuildability is therefore improved.

Because the adhesive sealant SB binds the first separator 14 and the second separator 16 holding the fuel cell subunit 12, these parts are prevented from accidentally being separated when disassembling or reassembling the fuel cell stack, in a manner similar to the first and second examples.

According to the examples, a number of units of the first separators 14, the fuel cell subunits 12, and the second separators 16 are stacked. Then, the first end plate 80 and the second end plate 82 are fastened. Thus, the fuel cell stack N is assembled.

Figure 44:
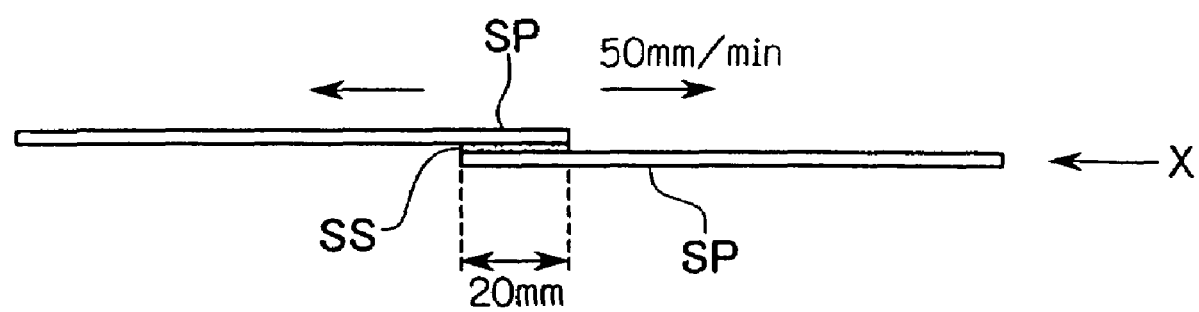
FIG. 44 is a view showing the experiment of the fourth embodiment.
Figure 45:
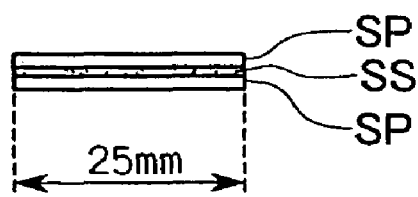
FIG. 45 is a view from the direction of arrow X in FIG. 12.

As shown in FIGS. 44 and 45, the shear strength of two separators SP which are bound by the sealant SS which has been liquid at the time of application is measured. The length of the overlapping portion in the longitudinal direction of the two separators SP is 20 mm, the width of the overlapping portion is 25 mm, and the tensile speed is 50 mm/min.

Table 4 shows the types of the tested liquid sealant, and the tested materials of the separators. The thermosetting fluorine-containing sealant 1 and the thermosetting fluorine-containing sealant 2 harden at 120° C. for three hours. Of the separator materials, the mold carbon is made of 80% of carbon powders and 20% of phenol resin, and the burned carbon is cut and processed from a burned carbon plate.

TABLE 4

|  | Material | Note |
|---|---|---|
| Sealant | thermosetting fluorine-containing sealant 1 | harden at 120° C. for three hours |
|  | thermosetting fluorine-containing sealant 2 | harden at 120° C. for three hours |
|  | thermosetting silicon sealant (addition reaction type) | harden at 120° C. for one hour |
| Separators | mold carbon | (carbon powder: 80%, phenol resin: 20%) |
|  | burned carbon | (cut and processed from a burned carbon plate) |
|  | SUS316 |  |
|  | Al |  |

Figure 46:
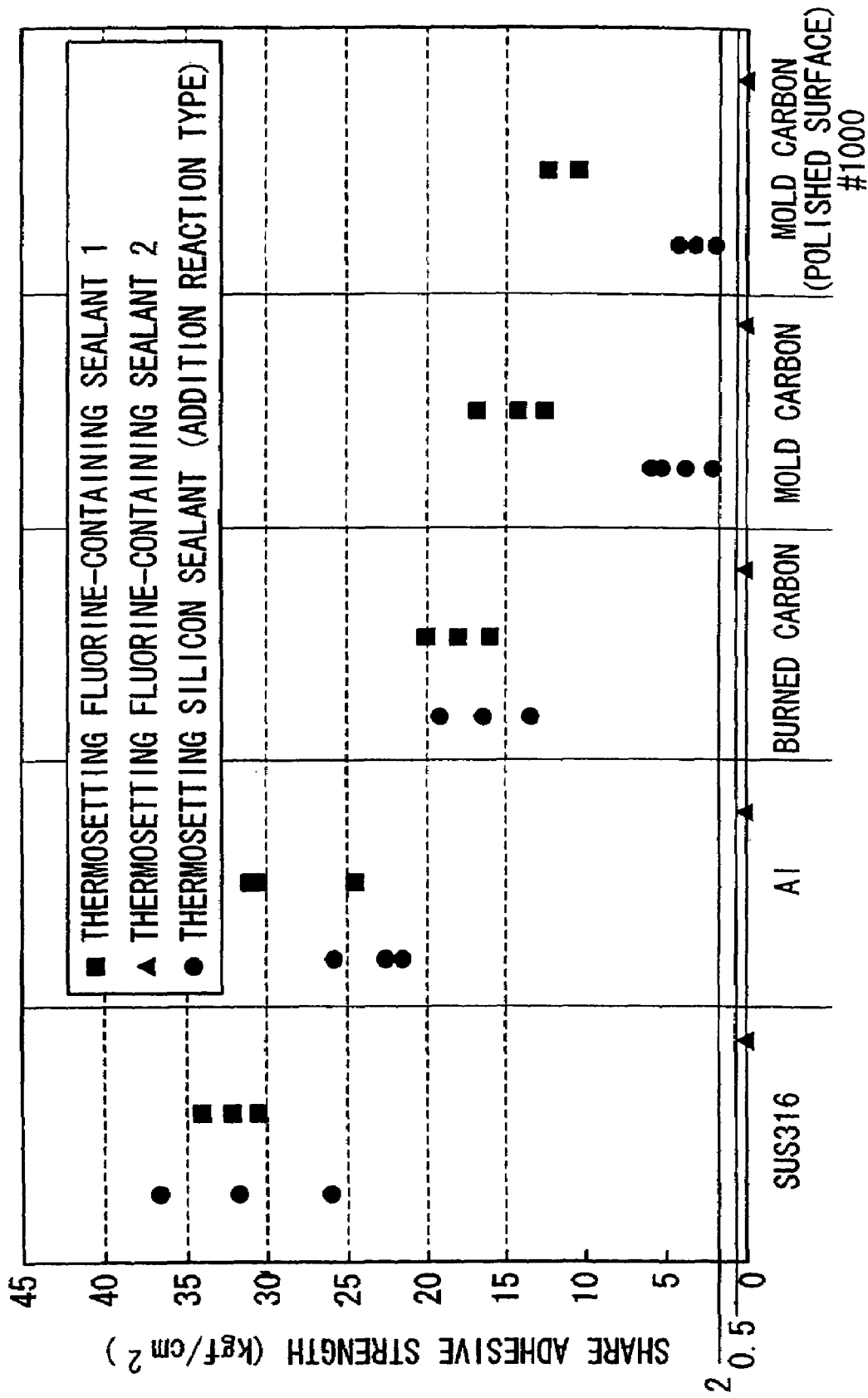
FIG. 46 is a graph showing the results of the experiment of the fourth embodiment.
Figure 47:
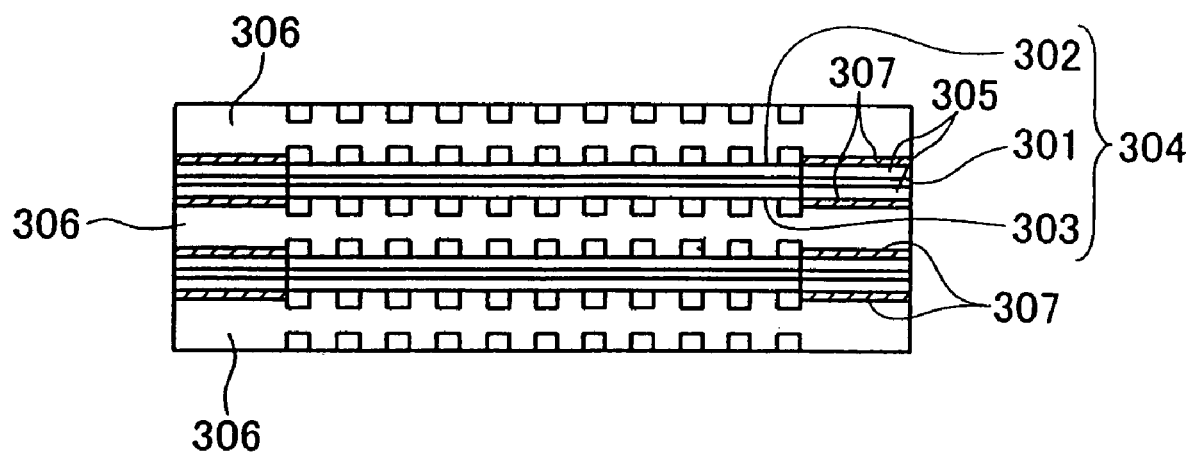
FIG. 47 is a cross-sectional view showing the conventional technique.

The results of the experiment are shown in FIG. 46. In FIG. 46, the vertical axis represents the shear adhesive strength (kgf/cm$^2$), and the horizontal axis represents the tested materials. According to the experiment, the separator material of the mold carbon, the burned carbon, the SUC316 (stainless steel), or Al, bonded by the thermosetting fluorine-containing sealant 1 is not separated even when the separators are damaged. Further, the thermosetting silicon sealant (addition reaction type) achieve the similar effects.

When the thermosetting silicon sealant is used, the shear adhesive strength of the mold carbon or the burned carbon is at least 2 kgf/cm$^2$. Therefore, when designing the fuel cell unit, or a number of fuel cell units as a module, each module can be stacked or removed, preventing the separation of the separators when the shear adhesive strength of the separators is equal to or greater than 2 kgf/cm$^2$. The adhesive sealant in the present invention has the shear adhesive strength equal to or greater than 2 kgf/cm$^2$.

The thermosetting fluorine-containing sealant 2 does not have any adhesive functional group. After this sealant has been applied onto the burned carbon separator or the mold carbon separator, and has hardened to complete the fuel cell unit, the separators are easily and manually separated.

Since the shear adhesive strength of the separators of the thermosetting fluorine-containing sealant 2 is 0 to 0.5 kgf/cm$^2$. When the shear adhesive strength is equal to or below 0.5 kgf/cm$^2$, a defective fuel cell unit 10 can be easily removed from the fuel cell stack.

More specifically, the non-adhesive sealant in the present invention has the shear adhesive strength equal to or below 0.5 kgf/cm$^2$. The low adhesive sealant which has the shear adhesive strength of 0.5 to 2 kgf/cm$^2$ is included in the non-adhesive sealant.

As described above, the non-adhesive sealant and the adhesive sealant is distinguished based on the shear adhesive strength at the time of using them, and not based on the types of the adhesive. For example, even if the adhesive sealant which has been applied, has made close contact with the separator, and has been heated to harden has the shear adhesive strength equal to or greater than 2 kgf/cm$^2$, the same adhesive sealant which has been applied, has been dried for a predetermined time, and makes contact with the separator may have a shear adhesive strength below 2 kgf/cm$^2$. This sealant is an non-adhesive sealant (low adhesive sealant).

According to the above embodiments, the fuel cell subunit 12 is held between the first separator 14 and the second separator 16. The adhesive liquid sealant SB is provided to prevent the leakage of the reaction gas to the peripheries of the anode electrode 22, the second diffusion layer 26, the cathode electrode 20, and the first diffusion layer 24. The non-adhesive liquid sealant SB1 or the liquid sealant KS1 is provided between the surface 14$b$ of another first separator 14 and the surface 16$b$ of the second separator 16. Therefore, the non-adhesive sealant SB1 (or KS1) can be easily separated from the first separator 14 or the second separator 16.

When replacing one of the fuel cell units 10 with the damaged first separator 14 or second separator 16, the first separators 14 and the second separators 16 can be easily disassembled and reassembled. Thus, the rebuildability is improved. Because the adhesive sealant SB binds the first separator 14 and the second separator 16 holding the fuel cell subunit 12, these parts are prevented from accidentally being separated when disassembling or reassembling the fuel cell stack.

Further, the liquid sealant SB is directly in contact with the projecting portion 18$a$ provided at the periphery of the solid polymer electrolyte membrane 18, is pressed between the solid polymer electrolyte membrane 18 and the first and second separators 14 and 16, fitting the varying sizes of the seal sections, and maintains gas-tightness between the solid polymer electrolyte membrane 18 and the first and second separators 14 and 16 while maintaining even pressure on the grooves 28, 30, 34, and 35. Therefore, the reaction force produced by the seal is uniform throughout the periphery between the first and second separators 14 and 16 and the fuel cell subunit 12, thereby making the seal uniform.

Even when the solid polymer electrolyte membrane 18 develops wrinkles, the liquid sealant S can be accordingly pressed, and therefore prevents the wrinkles of the solid polymer electrolyte membrane 18.

The fourth embodiment achieves similar effects to those of the first to third embodiments.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

The invention claimed is:

1. A fuel cell stack comprising:
a plurality of fuel cell units, wherein each of the fuel cell units includes:
a membrane electrode assembly having a solid polymer electrolyte membrane, an anode side diffusion electrode disposed at one side of the solid polymer electrolyte membrane, and a cathode side diffusion electrode disposed at the other side of the solid polymer electrolyte membrane;
a pair of separators which hold the membrane electrode assembly; and
an adhesive seal, provided between the separators, which was liquid sealant at the time of application, wherein the adhesive seal binds the separators together while sealing a periphery of the membrane electrode assembly;
wherein the plurality of the fuel cell units are stacked in a stacking direction to form the fuel cell stack; and
a non-adhesive seal in physical contact with the separator of one fuel cell unit and the separator of an adjacent fuel cell unit, wherein the non-adhesive seal seals an area between the separator of the one fuel cell unit and the separator of the adjacent fuel cell unit, and wherein the non-adhesive seal is made of a thermosetting material.

2. A fuel cell stack according to claim 1, wherein the non-adhesive seal was liquid sealant at the time of application.

3. A fuel cell stack according to claim 1, wherein the non-adhesive seal was solid sealant at the time of application.

4. A fuel cell stack comprising:
a plurality of fuel cell units, wherein each of the fuel cell units includes:
a membrane electrode assembly having a solid polymer electrolyte membrane, an anode side diffusion electrode disposed at one side of the solid polymer electrolyte membrane, and a cathode side diffusion electrode disposed at the other side of the solid polymer electrolyte membrane;
a pair of separators which hold the membrane electrode assembly; and
an adhesive seal, provided between the separators, which was liquid sealant at the time of application, wherein the adhesive seal binds the separators together while sealing a periphery of the membrane electrode assembly;
wherein the plurality of the fuel cell units are stacked in a stacking direction to form the fuel cell stack; and a non-adhesive seal in physical contact with the separator of one fuel cell unit and the separator of an adjacent fuel cell unit, wherein the non-adhesive seal is made of a thermosetting material, the non-adhesive seal seals an area between the separator of the one fuel cell unit and the separator of the adjacent fuel cell unit, and wherein a shear adhesiveness strength of the non-adhesive seal is equal to or less than 0.5 kgf/cm$^2$.

* * * * *